(12) United States Patent
Nickerson et al.

(10) Patent No.: US 11,460,876 B1
(45) Date of Patent: Oct. 4, 2022

(54) METHODS AND DEVICES FOR FAULT TOLERANT QUANTUM GATES

(71) Applicant: Psiquantum, Corp., Palo Alto, CA (US)

(72) Inventors: Naomi Nickerson, San Francisco, CA (US); Hector Bombin Palomo, Kyoto (JP); Benjamin Brown, Palo Alto, CA (US)

(73) Assignee: PSIQUANTUM, CORP., Palo Alto, CA (US)

( * ) Notice: Subject to any disclaimer, the term of this patent is extended or adjusted under 35 U.S.C. 154(b) by 617 days.

(21) Appl. No.: 16/509,219

(22) Filed: Jul. 11, 2019

Related U.S. Application Data

(60) Provisional application No. 62/772,587, filed on Nov. 28, 2018, provisional application No. 62/696,846, filed on Jul. 11, 2018.

(51) Int. Cl.
*G06E 3/00* (2006.01)
*G06N 10/00* (2022.01)

(52) U.S. Cl.
CPC ............ *G06E 3/005* (2013.01); *G06N 10/00* (2019.01)

(58) Field of Classification Search
None
See application file for complete search history.

(56) References Cited

U.S. PATENT DOCUMENTS

| | | | | |
|---|---|---|---|---|
| 10,268,232 | B2* | 4/2019 | Harris | G06N 3/04 |
| 11,321,627 | B1* | 5/2022 | Arriola | H03K 17/92 |
| 2020/0401927 | A1* | 12/2020 | Nickerson | G06N 99/00 |
| 2022/0147856 | A1* | 5/2022 | Kliuchnikov | G06N 10/00 |

* cited by examiner

*Primary Examiner* — Jany Richardson
(74) *Attorney, Agent, or Firm* — Kilpatrick Townsend & Stockton LLP

(57) ABSTRACT

A method includes obtaining a plurality of entangled qubits, with high fault tolerance, represented by a lattice structure. The lattice structure includes a plurality of contiguous lattice cells. A first subset of the plurality of entangled qubits defines a first plane, and a second subset of the plurality of entangled qubits defines a second plane that is parallel to and offset from the first plane. The plurality of entangled qubits includes a defect qubit that is entangled with at least one face qubit on the first plane and at least one edge qubit on the second plane.

20 Claims, 16 Drawing Sheets

METHODS AND DEVICES FOR FAULT TOLERANT QUANTUM GATES

CROSS-REFERENCES TO RELATED APPLICATIONS

This application claims priority to U.S. Provisional Patent Application No. 62/772,587, filed Nov. 28, 2018, entitled, "Methods and Deices for Fault Tolerant Quantum Gates" and to U.S. Provisional Patent Application No. 62/696,846, filed Jul. 11, 2018, entitled, "Methods and Deices for Obtaining Defects and Twists in Quantum Cluster States," each of which is hereby incorporated by reference in their entireties for all purposes. Additionally, U.S. Provisional Patent Application No. 62/770,648, filed on Nov. 21, 2018, titled "Generation of a Cluster State for Universal Quantum Computing from Bell Pairs," is hereby incorporated by reference in its entireties for all purposes.

BACKGROUND OF THE INVENTION

In fault tolerant quantum computing, quantum error correction is required to avoid an accumulation of qubit errors that then leads to erroneous computational outcomes. One method of achieving fault tolerance is to employ topological codes for quantum error correction. More specifically, a collection of physical qubits can be generated in an entangled state that encodes for a single logical qubit that is protected from errors. In addition to encoding the logical qubit, there remains a need for logical gates that can operate on the logical qubit fault tolerantly, i.e., there remains a need for encoded quantum gate designs that operate on the individual physical qubits of the encoded logical qubit without introducing additional errors on the logical qubit.

SUMMARY OF THE INVENTION

In some embodiments, a method includes obtaining a plurality of entangled qubits represented by a lattice structure, the lattice structure including a plurality of contiguous lattice cells, a respective edge of a respective lattice cell corresponding to a respective qubit of the plurality of entangled qubits, a respective face of the respective lattice cell corresponding to a respective qubit of the plurality of entangled qubits, the respective qubit that corresponds to the respective face of the respective lattice cell being entangled with respective qubits that correspond to respective edges of the respective lattice cell that are adjacent to the respective face of the respective lattice cell. A first subset of the plurality of entangled qubits defines a first plane; a second subset of the plurality of entangled qubits, that is distinct from, mutually exclusive to, and adjacent to, the first subset of the plurality of entangled qubits, defines a second plane that is parallel to and offset from the first plane. The plurality of entangled qubits includes a defect qubit that is entangled with at least one face qubit on the first plane and at least one edge qubit on the second plane.

In some embodiments, the defect qubit is entangled with at least two edge qubits on the first plane and the defect qubit is entangled with at least two face qubits on the second plane.

In some embodiments, the defect qubit is entangled with at least three edge qubits on the first plane; or the defect qubit is entangled with at least three face qubits on the second plane.

In some embodiments, the method further includes obtaining the plurality of entangled qubits by receiving a first set of entangled qubits, receiving a second set of entangled qubits; and fusing at least a subset of the first set of entangled qubits with at least a subset of the second set of entangled qubits so that the defect qubit is entangled with the at least one face qubit on the first plane and the at least one qubit on the second plane.

In some embodiments, the plurality of entangled qubits includes at least four pairs of surfaces representing a Hadamard gate, each pair of surfaces of the four pairs of surfaces having a first surface that is a primal boundary and a second surface that is a dual boundary that is adjacent to, and separated by a common defect layer including the defect qubit from, the primal boundary. A first surface of a first pair of surfaces of the four pairs of surfaces is in contact with a second surface of a second pair of surfaces, that is distinct from the first pair of surfaces, of the four pairs of surfaces. A second surface of the first pair of surfaces is in contact with a first surface of the second pair of surfaces. The first surface of the second pair of surfaces is in contact with a second surface of a third pair of surfaces, that is distinct from the first pair of surfaces and the second pair of surfaces, of the four pairs of surfaces. The second surface of the second pair of surfaces is in contact with a first surface of the third pair of surfaces. The first surface of the third pair of surfaces is in contact with a second surface of a fourth pair of surfaces, that is distinct from the first pair of surfaces, the second pair of surfaces, and the third pair of surfaces, of the four pairs of surfaces. The second surface of the third pair of surfaces is in contact with a first surface of the fourth pair of surfaces. The first surface of the fourth pair of surfaces is in contact with the second surface of the first pair of surfaces, and the second surface of the fourth pair of surfaces is in contact with the first surface of the first pair of surfaces.

In some embodiments, the Hadamard gate has an input surface adjacent to the first surface of the first pair of surfaces, the second surface of the second pair of surfaces, the first surface of the third pair of surfaces, and the second surface of the fourth pair of surfaces, and an output surface that is opposite to the input surface. The output surface is adjacent to the second surface of the first pair of surfaces, the first surface of the second pair of surfaces, the second surface of the third pair of surfaces, and the first surface of the fourth pair of surfaces. The method includes performing quantum measurements on at least a subset of the plurality of entangled qubits to perform a Hadamard operation on information represented by one or more qubits on the input surface of the plurality of entangled qubits, thereby obtaining one or more processed qubits on the output surface of the plurality of entangled qubits.

In some embodiments, at least a subset of the plurality of entangled qubits represents a phase gate having at least two corner lines. A first corner line of the two corner lines is located on one or more boundaries of the phase gate. A first portion of a second corner line of the two corner lines is located on one or more boundaries of the phase gate. A twist line, extending from the first portion of the second corner line, is located within the phase gate, the twist line at least partially defining a defect layer that includes the defect qubit. A second portion of the second corner line, extending from the twist line, is located on one or more boundaries of the phase gate.

In some embodiments, the plurality of entangled qubits includes at least four surfaces corresponding to a phase gate, a first surface of the four surfaces being a dual boundary, a second surface of the four surfaces being a primal boundary, a third surface of the four surfaces being a primal boundary, and a fourth surface of the four surfaces being a dual boundary. A first portion of the first surface is in contact with the second surface, a second portion of the first surface is in contact with the third surface, a first portion of the fourth surface being is in contact with the third surface, and a second portion of the fourth surface is in contact with the second surface.

In some embodiments, the plurality of entangled qubits includes at least four surfaces corresponding to a phase gate. A first surface of the four surfaces being a primal boundary, a second surface of the four surfaces being a dual boundary, a third surface of the four surfaces being a dual boundary, and a fourth surface of the four surfaces being a primal boundary. A first portion of the first surface is in contact with the second surface, a second portion of the first surface is in contact with the third surface, a first portion of the fourth surface is in contact with the third surface, and a second portion of the fourth surface is in contact with the second surface.

In some embodiments, the phase gate has an input surface adjacent to the first surface, the second surface, and the fourth surface. The phase gate also includes an output surface that is opposite to the input surface, the output surface being adjacent to the first surface, the third surface, and the fourth surface. In some embodiments, the method further includes performing quantum measurements on at least a subset of the plurality of entangled qubits to perform a phase shift operation on information represented by one or more qubits on the input surface of the plurality of entangled qubits, thereby obtaining one or more processed qubits on the output surface of the plurality of entangled qubits.

In some embodiments, a photonic device includes one or more gates configured to perform the method of any of the paragraphs above, wherein each gate includes one or more beam splitters.

In some embodiments, a computer system includes one or more processors and memory storing one or more programs for execution by the one or more processors. The one or more programs can include instructions for performing the method of any of above paragraphs.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION OF THE INVENTION

Figure 1:
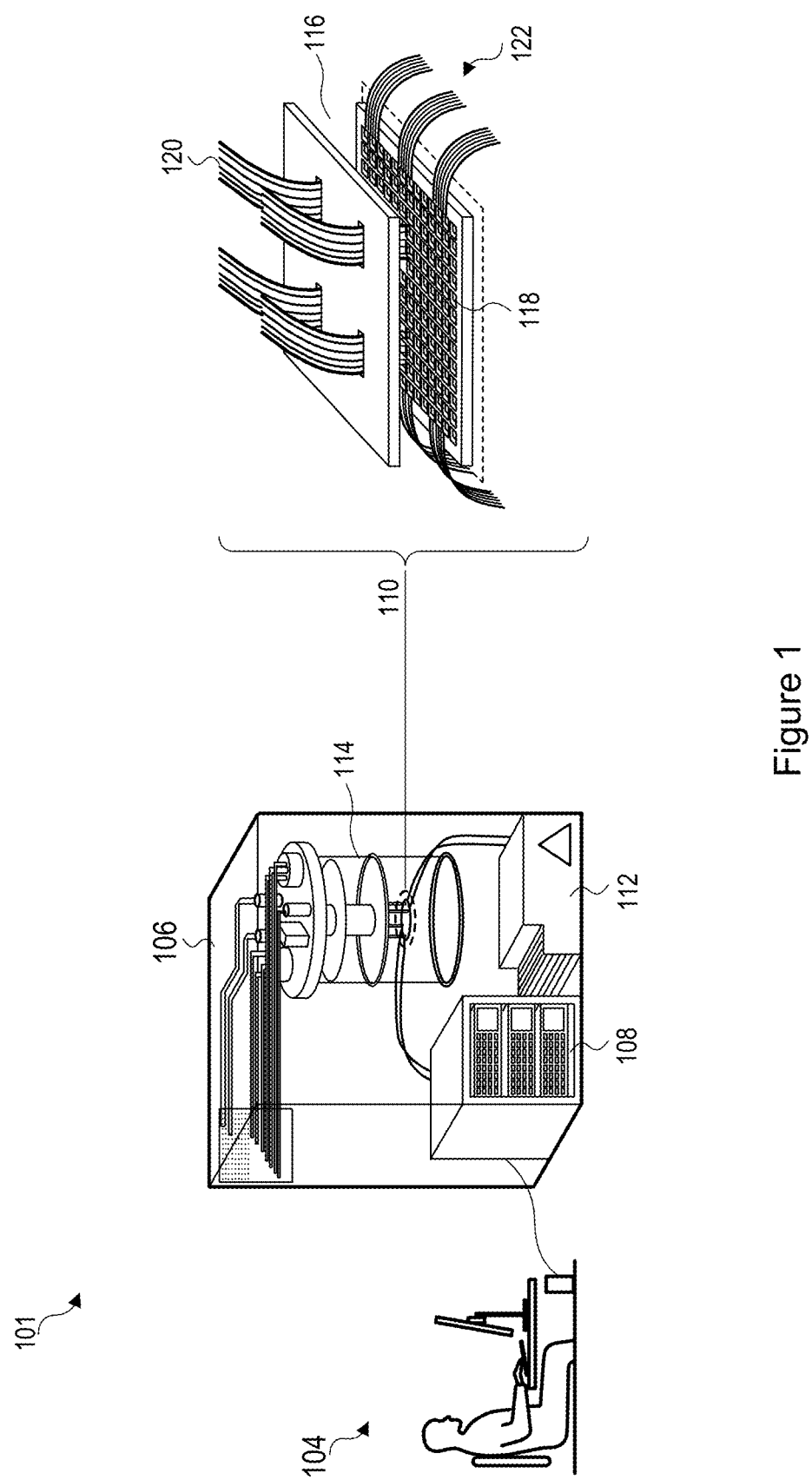
FIG. 1 shows a hybrid computing system in accordance with one or more embodiments.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

I. Introduction to Qubits and Path Encoding

The dynamics of quantum objects, e.g., photons, electrons, atoms, ions, molecules, nanostructures, and the like, follow the rules of quantum theory. More specifically, in quantum theory, the quantum state of a quantum object, e.g., a photon, is described by a set of physical properties, the complete set of which is referred to as a mode. In some embodiments, a mode is defined by specifying the value (or distribution of values) of one or more properties of the quantum object. For example, again for photons, modes can be defined by the frequency of the photon, the position in space of the photon (e.g., which waveguide or superposition of waveguides the photon is propagating within), the associated direction of propagation (e.g., the k-vector for a photon in free space), the polarization state of the photon (e.g., the direction (horizontal or vertical) of the photon's electric and/or magnetic fields) and the like.

For the case of photons propagating in a waveguide, it is convenient to express the state of the photon as one of a set of discrete spatio-temporal modes. For example, the spatial mode $k_i$ of the photon is determined according to which one of a finite set of discrete waveguides the photon can be propagating in. Furthermore, the temporal mode $t_j$ is determined by which one of a set of discrete time periods (referred to herein as "bins") the photon can be present in. In some embodiments, the temporal discretization of the system can be provided by the timing of a pulsed laser which is responsible for generating the photons. In the examples below, spatial modes will be used primarily to avoid complication of the description. However, one of ordinary skill will appreciate that the systems and methods can apply to any type of mode, e.g., temporal modes, polarization modes, and any other mode or set of modes that serves to specify the quantum state. Furthermore, in the description that follows, embodiments will be described that employ photonic waveguides to define the spatial modes of the photon. However, one of ordinary skill having the benefit of this disclosure will appreciate that any type of mode, e.g., polarization modes, temporal modes, and the like, can be used without departing from the scope of the present disclosure.

For quantum systems of multiple indistinguishable particles, rather than describing the quantum state of each particle in the system, it is useful to describe the quantum state of the entire many-body system using the formalism of Fock states (sometimes referred to as the occupation number representation). In the Fock state description, the many-body quantum state is specified by how many particles there are in each mode of the system. Because modes are the complete set of properties, this description is sufficient. For example, a multi-mode, two particle Fock state $|1001\rangle_{1,2,3,4}$ specifies a two-particle quantum state with one photon in mode 1, zero photons in mode 2, zero photons in mode three, and 1 photon in mode four. Again, as introduced above, a mode can be any set of properties of the quantum object (and can depend on the single particle basis states being used to define the quantum state). For the case of the photon, any two modes of the electromagnetic field can be used, e.g., one may design the system to use modes that are related to a degree of freedom that can be manipulated passively with linear optics. For example, polarization, spatial degree of freedom, or angular momentum, could be used. For example, the four-mode system represented by the two particle Fock state $|1001\rangle_{1,2,3,4}$ can be physically implemented as four distinct waveguides with two of the four waveguides (representing mode 1 and mode 4, respectively) having one photon travelling within them. Other examples of a state of such a many-body quantum system are the four photon Fock state $|1111\rangle_{1,2,3,4}$ that represents each waveguide containing one photon and the four photon Fock state $|2200\rangle_{1,2,3,4}$ that represents waveguides one and two respectively housing two photons and waveguides three and four housing zero photons. For modes having zero photons present, the term "vacuum mode" is used. For example, for the four photon Fock state $|2200\rangle_{1,2,3,4}$ modes 3 and 4 are referred to herein as "vacuum modes" (also referred to as "ancilla modes").

As used herein, a "qubit" (or quantum bit) is a physical quantum system with an associated quantum state that can be used to encode information. Qubits, in contrast to classical bits, can have a state that is a superposition of logical values such as 0 and 1. In some embodiments, a qubit is "dual-rail encoded" such that the logical value of the qubit is encoded by occupation of one of two modes by exactly one photon (a single photon). For example, consider the two spatial modes of a photonic system associated with two distinct waveguides. In some embodiments, the logical 0 and 1 values can be encoded as follows:

$$|0\rangle_L = |10\rangle_{1,2} \quad (1)$$

$$|1\rangle_L = |01\rangle_{1,2} \quad (2)$$

where the subscript "L" indicates that the ket represents a logical value (e.g., a qubit value) and, as before, the notation $|ij\rangle_{1,2}$ on the right-hand side of the Equations (1)-(2) above indicates that there are i photons in a first waveguide and j photons in a second waveguide, respectively (e.g., where i and j are integers). In this notation, a two qubit state having a logical value $|01\rangle_L$ (representing a state of two qubits, the first qubit being in a '0' logical state and the second qubit being in a '1' logical state) may be represented using photon occupations across four distinct waveguides by $|1001\rangle_{1,2,3,4}$ (i.e., one photon in a first waveguide, zero photons in a second waveguide, zero photons in a third waveguide, and one photon in a fourth waveguide). In some instances, throughout this disclosure, the various subscripts are omitted to avoid unnecessary mathematical clutter.

A Bell pair is a pair of qubits in any type of maximally entangled state referred to as a Bell state. For dual rail encoded qubits, examples of Bell states include:

$$|\Phi^+\rangle = \frac{|0\rangle_L|0\rangle_L + |1\rangle_L|1\rangle_L}{\sqrt{2}} = \frac{|1010\rangle + |0101\rangle}{\sqrt{2}} \quad (3)$$

$$|\Phi^-\rangle = \frac{|0\rangle_L|0\rangle_L - |1\rangle_L|1\rangle_L}{\sqrt{2}} = \frac{|1010\rangle - |0101\rangle}{\sqrt{2}} \quad (4)$$

$$|\Psi^+\rangle = \frac{|0\rangle_L|1\rangle_L + |1\rangle_L|0\rangle_L}{\sqrt{2}} = \frac{|1001\rangle + |0110\rangle}{\sqrt{2}} \quad (5)$$

$$|\Psi^-\rangle = \frac{|0\rangle_L|1\rangle_L - |1\rangle_L|0\rangle_L}{\sqrt{2}} = \frac{|1001\rangle - |0110\rangle}{\sqrt{2}} \quad (6)$$

In a computational basis (e.g., logical basis) with two states, a Greenberger-Horne-Zeilinger state is a quantum superposition of all qubits being in a first state of the two states superposed with all of qubits being in a second state. Using logical basis described above, the general M-qubit GHZ state can be written as:

$$|GHZ\rangle = \frac{|0\rangle^{\otimes M} + |1\rangle^{\otimes M}}{\sqrt{2}} \quad (7)$$

II. A Hybrid Classical-Quantum Computing System

FIG. 1 shows a hybrid computing system in accordance with one or more embodiments. The hybrid computing system 101 includes a user interface device 104 that is communicatively coupled to a hybrid quantum computing (QC) sub-system 106, described in more detail below in FIG. 2. The user interface device 104 can be any type of user interface device, e.g., a terminal including a display, keyboard, mouse, touchscreen and the like. In addition, the user interface device can itself be a computer such as a personal computer (PC), laptop, tablet computer and the like. In some embodiments, the user interface device 104 provides an interface with which a user can interact with the hybrid QC subsystem 106. For example, the user interface device 104 may run software, such as a text editor, an interactive development environment (IDE), command prompt, graphical user interface, and the like so that the user can program, or otherwise interact with, the hybrid QC subsystem 106 to run one or more quantum algorithms. In other embodiments, the hybrid QC subsystem 106 may be pre-programmed and the user interface device 104 may simply be an interface where a user can initiate a quantum computation, monitor the progress, and receive results from the hybrid QC subsystem 106. Hybrid QC subsystem 106 further includes a classical computing system 108 coupled to one or more quantum computing chips 110. In some examples, the classical computing system 108 and the quantum computing chips 110 can be coupled to other electronic and/or optical components 112, e.g., pulsed pump lasers, microwave oscillators, power supplies, networking hardware, etc. In some embodiments that require cryogenic operation, the quantum computing chips 110 can be housed within a cryostat, e.g., cryostat 114. On other embodiments where cryogenic operation is not required, the quantum computing chips 110, the cryostat 114 may be replaced with any other enclosure. In some embodiments, the quantum computing chips 110 can include one or more constituent chips, e.g., hybrid control electronics 116 and integrated photonics chip 118. Signals can be routed on- and off-chip any number of ways, e.g., via optical interconnects 120 and via other electronic interconnects 122. In addition, the hybrid computing system 101 may employ a quantum computing process, e.g., measurement-based quantum computing (MBQC), circuit-based quantum computing (CBQC) or any other quantum computing scheme.

Figure 2:
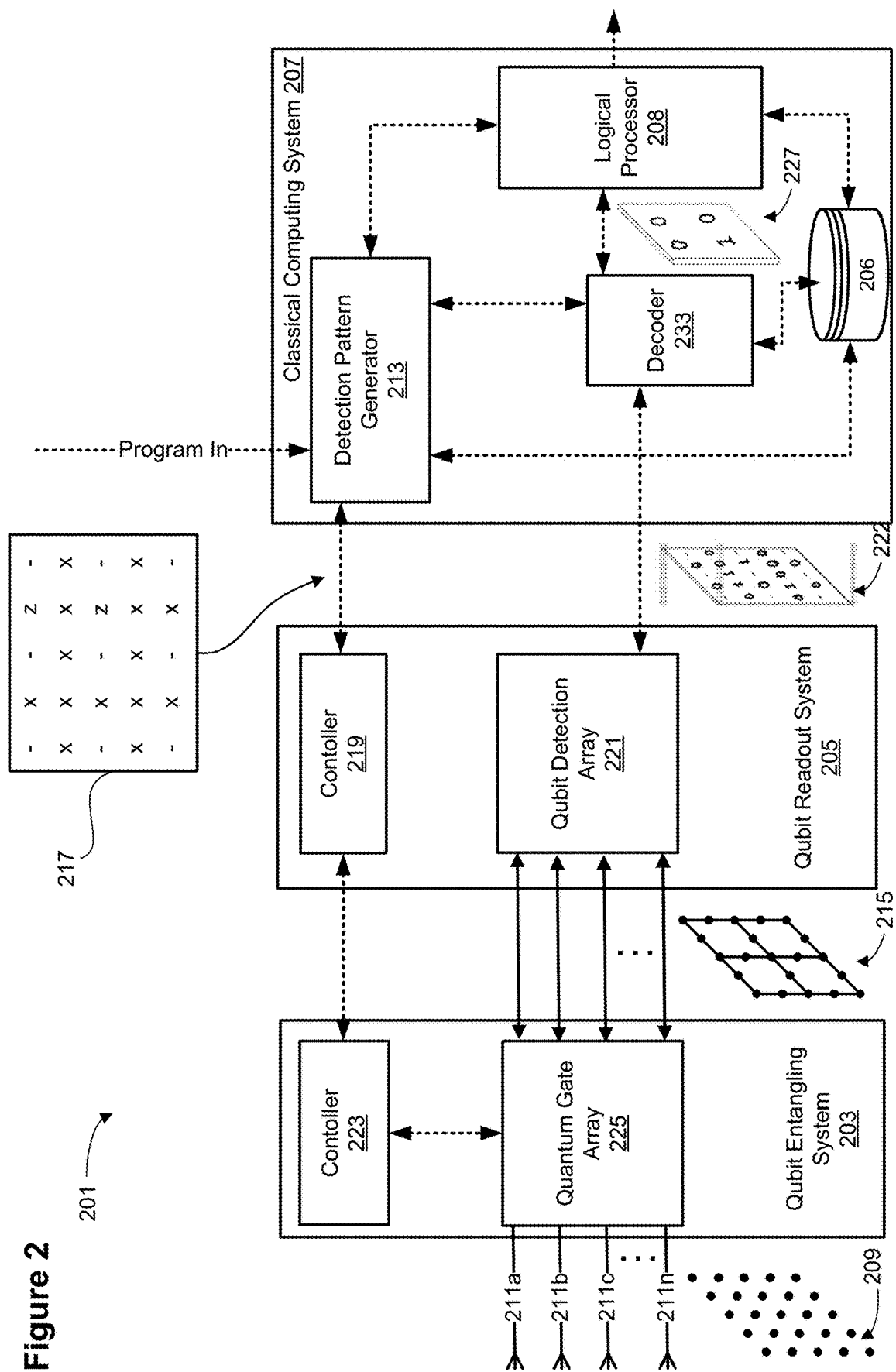
FIG. 2 shows a block diagram of a hybrid QC system 201 in accordance with some embodiments.

FIG. 2 shows a block diagram of a hybrid QC system 201 in accordance with some embodiments. Such a system can be associated with the hybrid computing system 101 introduced above in reference to FIG. 1. In FIG. 2, solid lines represent quantum information channels and dashed represent classical information channels. The hybrid QC system 201 includes a qubit entangling system 203, qubit readout system 205, and classical computing system 207. In some embodiments, the qubit entangling system 203 takes as input a collection of N physical qubits, e.g., physical qubits 209 (also represented schematically as inputs 211a, 211b, 211c, . . . , 211n) and generates quantum entanglement between two or more of them to generate an entangled state 215. For example, in the case of photonic qubits, the qubit entangling system 203 can be a linear optical system such as an integrated photonic circuit that includes waveguides, beam splitters, photon detectors, delay lines, and the like. In some examples, the entangled state 215 can be a lattice, cluster, or graph state, or one part of a larger lattice, cluster, or graph state that is created over the course of several clock cycles of the quantum computer. In some embodiments, the input qubits 209 can be a collection of quantum systems and/or particles and can be formed using any qubit architecture. For example, the quantum systems can be particles such as atoms, ions, nuclei, and/or photons. In other examples, the quantum systems can be other engineered quantum systems such as flux qubits, phase qubits, or charge qubits (e.g., formed from a superconducting Josephson junction), topological qubits (e.g., *Majorana fermions*), or spin qubits formed from vacancy centers (e.g., nitrogen vacancies in diamond). Furthermore, for the sake of clarity of description, the term "qubit" is used herein although the system can also employ quantum information carriers that encode information in a manner that is not necessarily associated with a binary bit. For example, qudits can be used, i.e., quantum systems that can encode information in more than two quantum states in accordance with some embodiments.

In accordance with some embodiments, the hybrid QC system 201 can be a quantum circuit-based quantum computer, a measurement-based quantum computer, or any other type of quantum computer. In some embodiments, a software program (e.g., a set of machine-readable instructions) that represents the quantum algorithm to be run on the hybrid QC system 201 can be passed to a classical computing system 207 (e.g., corresponding to system 208 in FIG. 1 above). The classical computing system 207 can be any type of computing device such as a PC, one or more blade servers, and the like, or even a high-performance computing system such as a supercomputer, server farm, and the like. Such a system can include one or more processors (not shown) coupled to one or more computer memories, e.g., memory 206. Such a computing system will be referred to herein as a "classical computer." In some examples, the software program can be received by a classical computing module, referred to herein as a detection pattern generator 213. One function of the detection pattern generator 213 is to generate a set of machine-level instructions from the input software program (which may originate as code that can be more easily written by a user to program the quantum computer), i.e., the detection pattern generator 213 can operate as a compiler, logic processor, and/or encoder to allow software programs to be run on the quantum computer. Detection pattern generator 213 can be implemented as pure hardware, pure software, or any combination of one or more hardware or software components or modules. In some examples, the compiled machine-level instructions take the form of one or more data frames that instruct the qubit readout circuit to make one or more quantum measurements on the entangled state 215. Measurement pattern 217 (e.g., a data frame) is one example of the set of measurements and/or gates that should be applied to the qubits of entangled state 215 during a certain clock cycle as the program is executed. In other examples, e.g., the measurement pattern 217 can include instructions for applying multi-qubit measurements and/or multi-qubit gates, e.g., in the case where a fusion gate is desired to be applied to two or more qubits or when stabilizer measurements are being performed. In some embodiments, several measurement patterns 217 can be stored in memory 206 as classical data. Generally, the measurement patterns 217 can dictate whether or not a detector from the qubit detection array 221 of the qubit readout circuit 205 should make a measurement on a given qubit that makes up the entangled state 215. In addition, the measurement pattern 217 can also store which basis (e.g., Pauli X, Y, Z, etc.) the measurement should be made in order to execute the program. In some examples, the measurement pattern 217 can also include a set of gates that should be applied by the qubit entangling circuit to the next set of physical qubits 209 that are to be processed at some future clock cycle of the hybrid QC system 201.

A controller circuit 219 of the qubit readout circuit 205 can receive data that encodes the measurement pattern 217 and generate the configuration signals necessary to drive a set of detectors within the qubit detection array 221. The detectors can be any detector that can detect the quantum states of one or more of the qubits in the entangled state 215. For example, for the case of photonic qubits, the detectors can be single photon detectors that are coupled to one or more waveguides, beam splitters, interferometers, switches, polarizers, polarization rotators and the like. One of ordinary skill will appreciate that many types of detectors may be used depending on the particular qubit architecture.

In some embodiments, the result of applying the detection pattern 217 to the qubit detection array is a readout operation that "reads out" the quantum states of the qubits in the entangled state 215. Once this measurement is accomplished, the quantum information stored within the entangled state 215 is converted to classical information that corresponds to a set of eigenvalues that are measured by the detectors, referred to herein as "measurement outcomes." These measurement outcomes can be stored in a measurement outcome data frame, e.g., data frame 222 and passed back to the classical computing system for further processing.

In some embodiments, any of the submodules in the hybrid QC system 201, e.g., controller 223, quantum gate array 225, detection array 221, controller 219, detection pattern generator 213, decoder 233, and logical processor 208 can include any number of classical computing components such as processors (CPUs, GPUs, TPUs) memory (any form of RAM, ROM), hard coded logic components (classical logic gates such as AND, OR, XOR, etc.) and/or programmable logic components such as field programmable gate arrays (FPGAs and the like). These modules can also include any number of application specific integrated circuits (ASICs), microcontrollers (MCUs), systems on a chip (SOCs), and other similar microelectronics.

As described herein, the logical qubit measurement outcomes 227 can be fault tolerantly recovered, e.g., via decoder 233, from the measurement outcomes 222 of the physical qubits. In the case of a cluster state that is also a stabilizer state, the error syndrome generated by the measurement of joint parity measurements (formed from the combination of one or more stabilizer measurements) are used by the decoder to identify and correct errors so that the correct logical qubit measurement outcome can be determined. Logical processor 208 can then process the logical outcomes as part of the running of the program. As shown, the logical processor 208 can feed back information to the detection pattern generator 213 to affect downstream gates and/or measurements to ensure that the computation proceeds fault tolerantly.

In the description that follows, embodiments are described that employ spatial modes of photons as the qubit system, but one of ordinary skill will appreciate that any type of qubit described by any type of mode can be employed without departing from the scope of the present disclosure. Furthermore, in what follows, photonic waveguides are used to define the spatial modes of the photon. However, one of ordinary skill having the benefit of this disclosure will appreciate that any type of mode, e.g., polarization modes, temporal modes, and the like, can be used without departing from the scope of the present disclosure. The diagrams shown in the remaining figures are schematic diagrams with each horizontal line representing a mode of a quantum system, e.g., a waveguide.

III. Exemplary Cluster States

Quantum computation is often considered in the framework of 'Circuit Based Quantum Computation' (CBQC) in which operations (or gates) are performed on physical qubits. Gates can be either single qubit unitary operations (rotations), or two qubit entangling operations such as the CNOT gate. As introduced above in the context of FIG. 2, Measurement Based Quantum Computation (MBQC) is another approach to implementing computation. In the MBQC setting, computation proceeds by first preparing a particular entangled state of many qubits (e.g., entangled state 215), and then carrying out a series of single qubit measurements (e.g., the detection pattern 217) to enact the quantum computation.

A simple example is a single qubit being acted upon by a Hadamard gate. In CBQC a physical interaction is applied to the qubit which rotates it's state to apply the Hadamard. In a simplified MBQC picture, a linear cluster state is first prepared; then the first qubit is measured in the X basis. After the first qubit is measured, the quantum information has had a Hadamard applied to it and now exists on the second qubit in the chain (this transfer of the quantum information from the first qubit to the second is sometimes referred to as quantum teleportation).

Any operation that can be done in CBQC can also be done in MBQC. But in the simple way described above (linear cluster state), a quantum computer can never be built in practice, since any error or loss in the system will eradicate the quantum information and destroy the computation, i.e., the linear cluster state quantum computer provides no intrinsic tolerance to errors. To deal with loss and errors the quantum information must be encoded in an error correcting code (in the case of CBQC) or in a fault tolerant cluster state (in the case of MBQC) such that the gates (CBQC) or measurements (MBQC) can be performed in a way that is tolerant to some amount of noise.

One fault tolerant cluster state that can be used in MBQC is the topological cluster state introduced by Raussendorf et al. and other volume codes such as those disclosed within International Patent Application No. PCT/US19/21241 and within International Patent Application No. PCT/US2019/021711 the entireties of which are incorporated by reference in their entireties for all purposes. These states allow all gates needed for quantum computation to be performed fault tolerantly. But, not all operations are equally easy. There are certain gates that are straightforward to do in the code. Such straightforward gates include state preparation and measurement in the $|0\rangle$ or $|+\rangle$ basis and entangling CNOT gates. However to serve as a general purpose quantum computer, the code must support at least two other gates: the Hadamard gate and the S gate (also referred to as the phase gate). To implement these in the Raussendorf lattice requires a process known as 'state injection', where an encoded ancillary resource state is prepared in order to facilitate the gate. This is a very resource intensive approach that requires a lot of additional physical resources to implement in practice. With so many resources being devoted to state injection, such a quantum computer has limited physical resources that remain to be dedicated to the quantum computation itself, thereby restricting the types of algorithms that can be performed.

In some embodiments, the systems and methods described herein provide for a modified cluster state that uses defects and twists in the topology of the cluster state to implement gates without the need for state injection. For example, some embodiments of the invention provide a modified cluster state that can implement both a Hadamard gate and/or an S gate fault tolerantly in an MBQC scheme. Furthermore one or more embodiments provides for a way to generate cluster states that can be used for MBQC from other codes, e.g., from non-CSS codes such as the twisted surface code, by a process referred to herein as foliation, as described in further detail in Appendix A of U.S. Provisional Application 62/772,587, the contents of which is hereby incorporated by reference in its entirety for all purposes.

Most generally, a cluster state of highly entangled qubits can be described by an undirected graph G=(V, E) with V and E denoting the sets of vertices and edges, respectively. Each vertex of the graph corresponds to a physical qubit in the cluster state and each edge of the graph represents entanglement between the physical qubits that terminate on that edge. One way to generate a cluster state is to start with the physical qubits all initialized in the $|+\rangle$ state, where $|+\rangle = (|0\rangle + |1\rangle)/\sqrt{2}$. Then, a controlled-phase gate CZ is applied to each pair i,j of qubits. Alternatively, in the case of linear optical quantum computing, a fusion gate can be applied instead of a CZ gate, as described in detail in U.S. Provisional Patent Application No. 62/770,648. Accordingly, any cluster state, which physically corresponds to a large entangled state of physical qubits can be described as $$|\Psi\rangle_{graph} = \prod_{(i,j)\in E} CZ_{i,j} |+\rangle^{\otimes |V|}$$

where the $CZ_{i,j}$ is the controlled phase gate operator. Thus, any cluster state can be graphically represented by a graph that includes vertices that represent physical qubits and edges that represent entanglement between them.

Figure 3A:
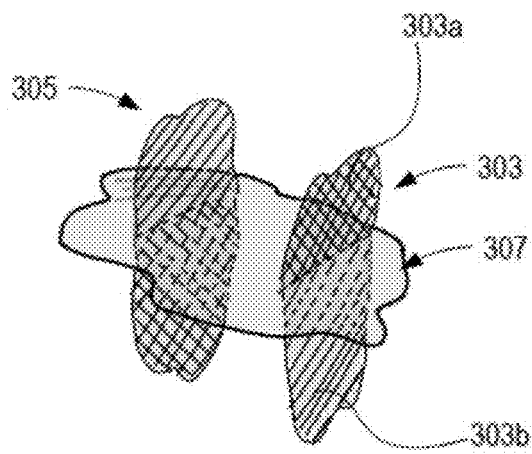
FIGS. 3A-3C illustrates several topological concepts used herein. In any given lattice structure, boundaries (at the outer surface of the lattice) and/or membranes (within the bulk of the lattice) can be labeled as "primal" or "dual" in accordance with some embodiments.
Figure 3B:
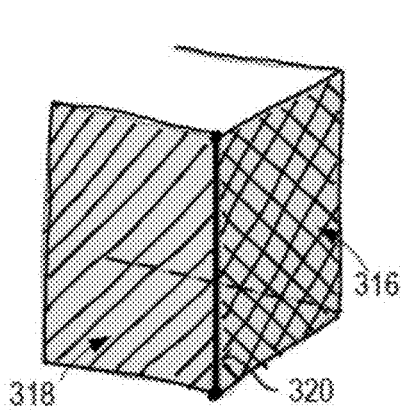
Figure 3C:
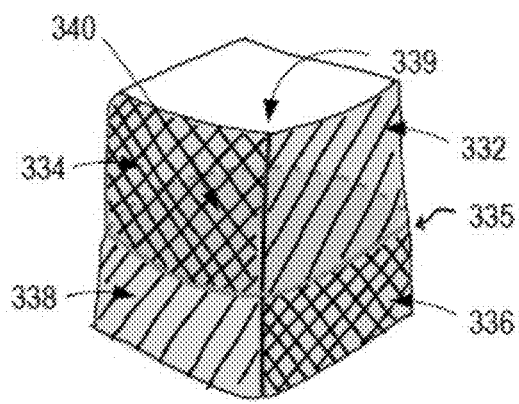

Before delving into the microscopic details of the cluster state, some more abstract terms and concepts will be introduced. FIGS. 3A-3C illustrates several topological concepts used herein. In some embodiments, the entanglement structure of the graph state described above may conform to a geometry that lends itself to a crystal lattice-like geometry having a collection of repeated unit cells. In any given lattice structure, boundaries (at the outer surface of the lattice) and/or membranes (within the bulk of the lattice) can be labeled as "primal" or "dual." Loosely speaking, primal surfaces (be them boundaries or membranes) can be formed from one or more connected outer surfaces of the primal lattice unit cell, while dual membranes can be formed from one or more connected outer surfaces of the dual lattice unit cell. In addition to primal and dual surfaces, defect surfaces can also exist within the crystal lattice. The result of a defect surface is that boundaries/membranes that cross a defect surface will change character, e.g., primal can change to dual and vice versa.

FIG. 3A shows two membranes 303 and 305 in the large bulk of a lattice (details of the lattice not shown). Primal membranes are shaded in parallel diagonal line crosshatch and dual membranes are shaded in intersecting diagonal line crosshatch. As these membranes cross internal defect membrane 307 (shaded in grey), their topological character switches from primal to dual and vice versa. For example, going from top to bottom in the figure, membrane 303 starts out as a dual membrane 303a and then switches to a primal membrane 303b after it crosses internal defect membrane 307. In FIG. 3A internal defect membrane 307 is fully contained within the bulk of the lattice and does not impinge an outer surface of the lattice.

FIG. 3B shows an example of how surfaces can transition from primal to dual without a defect surface by traversing an outer boundary line, such as corner line 320, of a first type in accordance with some embodiments. A portion of the lattice structure shown in FIG. 3B is represented as dual boundary 316 (shaded in intersecting diagonal line crosshatch) and primal boundary 318 (shaded in parallel diagonal line crosshatch). Although a dual boundary and a primal boundary include qubits on respective surfaces, individual qubits are not shown in this simplified graphical representation so as not to obscure other aspects of the lattice structure. FIG. 3B shows that the character of an outer boundary of the lattice will change (from dual to primal and vice versa) when crossing corner line 320.

FIG. 3C is an example of a lattice that includes both a corner line 339 and a defect surface 340 that terminates on the outer surface of the lattice. Boundary line 335 is of a second type, referred to herein as a transparent line 335, in accordance with some embodiments. In general, the transparent line 335 is a result of the termination of defect surface 340 at the outer edge of the lattice, as shown. Like for membranes that traverse the defect membrane in the bulk (FIG. 3A), outer surfaces that traverse the transparent line transition from primal to dual, e.g., as is the case for primal boundary 332 and dual boundary 336. FIG. 3C also shows corner line 339 located along the outer corner of the lattice that is the intersection between primal boundary 332 and dual boundary 334 and also the intersection between dual boundary 336 and primal boundary 338.

Figure 3D:
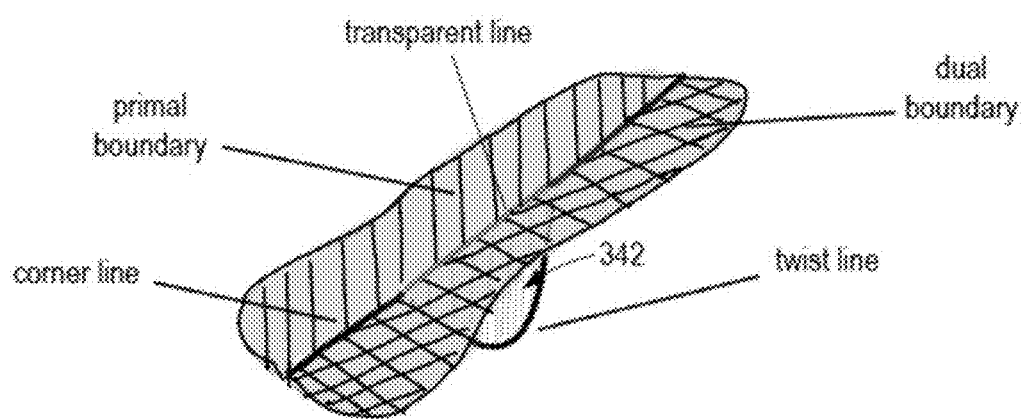
FIG. 3D shows another simplified graphical representation of a lattice to illustrate the notion of a twist line in accordance with some embodiments.

FIG. 3D shows another simplified graphical representation of a lattice to illustrate the notion of a twist line in accordance with some embodiments. As shown in FIG. 3D, a boundary line of a third type (referred to herein as a "twist line") extends from the corner line into the bulk of the lattice. This twist line boundary is the inner boundary of a defect surface that terminates in the bulk, e.g., defect surface 342. In this example, the twist line in FIG. 3D extends from, and is located between, two separate portions of a corner line, and represents the boundary of a defect surface 342 that is embedded in the lattice structure (e.g., the twist line is not located on a boundary of the lattice structure but rather in the internal boundary of the defect surface).

The diagrams represented in FIGS. 3A-3D illustrate how defects and twists can be used to transition primal membranes to dual membranes (and vise versa) both on the surface of the lattice and in the bulk. Manipulation of these surfaces, also referred to herein as "correlation surfaces," are important for designing gates such as the Hadamard and the S gate as is described in further detail in FIGS. 8A-8F.

Figure 8A:
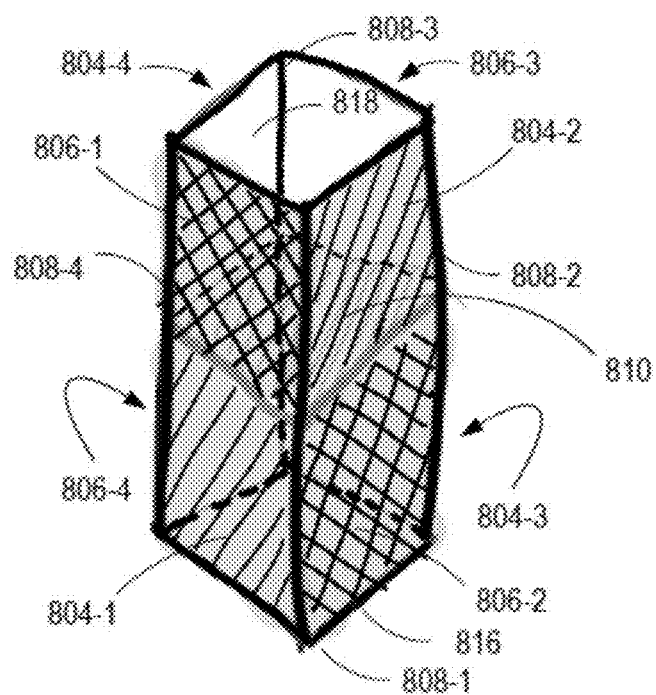
FIGS. 8A-8E illustrate examples of fault tolerant quantum gates in accordance with some embodiments.

FIG. 8A is a simplified graphical representation of a Hadamard gate in accordance with some embodiments. The Hadamard gate shown in FIG. 8A corresponds to a plurality of entangled qubits (e.g., a cluster state) having at least four pairs of (external) surfaces: a first pair of surfaces 804-1 and 806-1, a second pair of surfaces 804-2 and 806-2, a third pair of surfaces 804-3 and 806-3, and a fourth pair of surfaces 804-4 and 806-4. Each pair of surfaces has a primal boundary and a dual boundary. For example, in the first pair of surfaces, surface 804-1 is a primal boundary and surface 806-1 is a dual boundary; in the second pair of surfaces, surface 804-2 is a primal boundary and surface 806-2 is a dual boundary; in the third pair of surfaces, surface 804-3 is a primal boundary and surface 806-3 is a dual boundary; and in the fourth pair of surfaces, surface 804-4 is a primal boundary and surface 806-4 is a dual boundary.

In FIG. 8A, each pair of surfaces is in contact with adjacent pairs of surfaces along corner lines. For example, the first pair of surfaces 804-1 and 806-1 is in contact with the second pair of surfaces 804-2 and 806-2 along corner line 808-1, the second pair of surfaces 804-2 and 806-2 is in contact with the third pair of surfaces 804-3 and 806-3 along corner line 808-2, the third pair of surfaces 804-3 and 806-3 is in contact with the fourth pair of surfaces 804-4 and 806-4 along corner line 808-3, and the fourth pair of surfaces 804-4 and 806-4 is in contact with the first pair of surfaces 804-1 and 806-1 along corner line 808-4.

FIG. 8A also shows that the Hadamard gate includes defect layer 810 extending between the two surfaces of each pair of surfaces. As already described above in reference to FIGS. 3A-3D, the effect of the defect surface is to transition primal membranes/surfaces to dual membranes/surfaces and vice versa. In some embodiments, the Hadamard gate performs a Hadamard operation on a logical qubit, i.e., a qubit that is encoded in a topological code by a group of the physical cubits of the lattice. For example, by performing measurements in X-basis on physical qubits located within the Hadamard gate (e.g., qubits that are not located on the boundary), information represented by one or more qubits on an input surface of the Hadamard gate (e.g., the bottom surface 816) is processed and the Hadamard operation is applied to the logical qubit encoded by the lattice/cluster state. In some embodiments, the outcome of the Hadamard operation can be read out by measuring the physical qubits located on an output surface of the Hadamard gate (e.g., a top surface 818) or the processed logical cubit can be sent to other portions of the cluster state (not shown) for further processing.

Figure 8B:
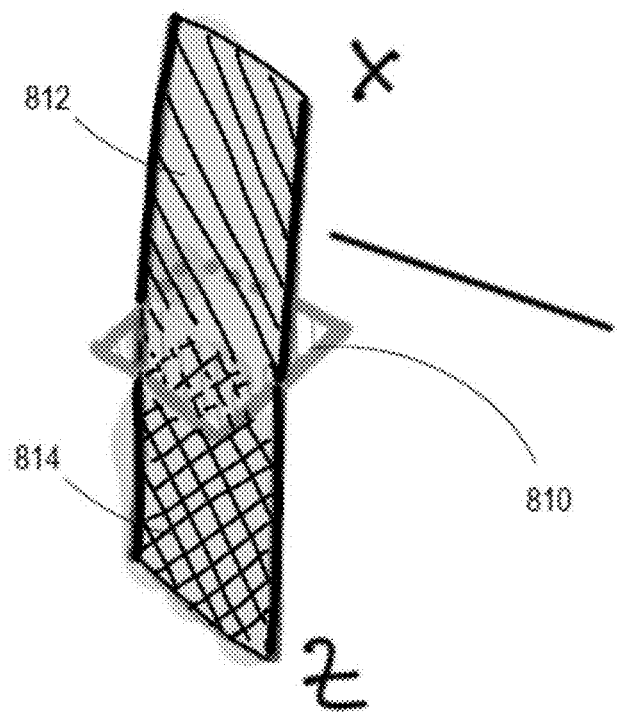

FIG. 8B is a simplified graphical representation of a membrane within the Hadamard gate shown in FIG. 8A. In FIG. 8B, a membrane extends, within the Hadamard gate, from the second pair of surfaces 804-2 and 806-2 to the fourth pair of surfaces 804-4 and 806-4 includes primal membrane 812 and dual membrane 814 on opposite sides of defect layer 810.

Figure 8C:
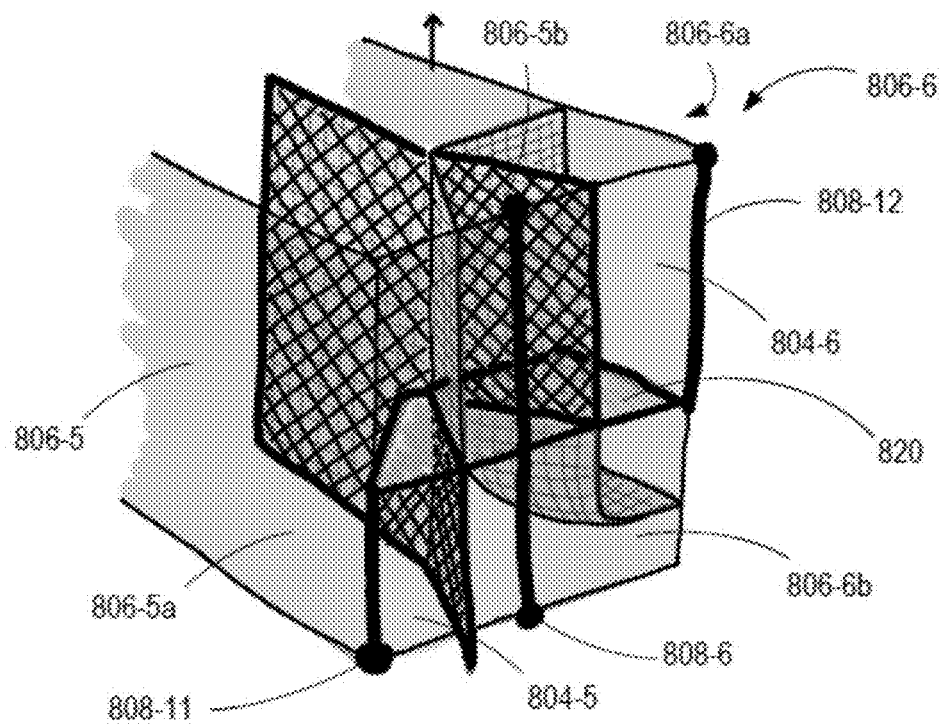

FIG. 8C is a simplified graphical representation of a phase gate (also referred to herein as an S gate) in accordance with some embodiments. The phase gate shown in FIG. 8C corresponds to a plurality of entangled qubits having at least four surfaces 806-5, 804-5, 804-6, and 806-6. In FIG. 8C, surface 806-5 is a dual boundary, surface 804-5 is a primal boundary, surface 804-6 is a primal boundary, and surface 806-6 is a dual boundary. A first portion of surface 806-5 is in contact with surface 804-5 along portion 808-11 of a corner line and a second portion of surface 806-5 is in contact with surface 804-6 along corner line 808-6. In addition, the second portion of surface 806-5 is in contact with surface 804-5 along a transparent line (of defect layer 820) in FIG. 8C. A first portion of surface 806-6 is in contact with surface 804-6 along portion 808-12 of a corner line and a second portion of surface 806-6 is in contact with surface 804-5 along corner line 808-6. In addition, the second portion of surface 806-6 is in contact with surface 804-6 along a transparent line (of defect layer 820).

Figure 8D:
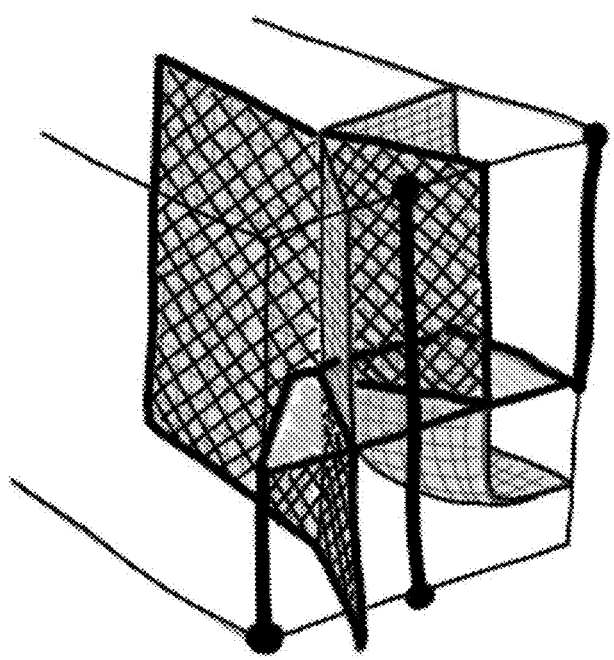

FIG. 8D is a simplified graphical representation of surfaces within the phase gate shown in FIG. 8C.

Although not shown explicitly in FIGS. 8C and 8D, in some embodiments, the plurality of entangled qubits corresponding to a phase gate has more than four surfaces. For example, the plurality of entangled qubits corresponding to a phase gate has a fifth surface that is a dual boundary, as shown in FIG. 8E.

Figure 8E:
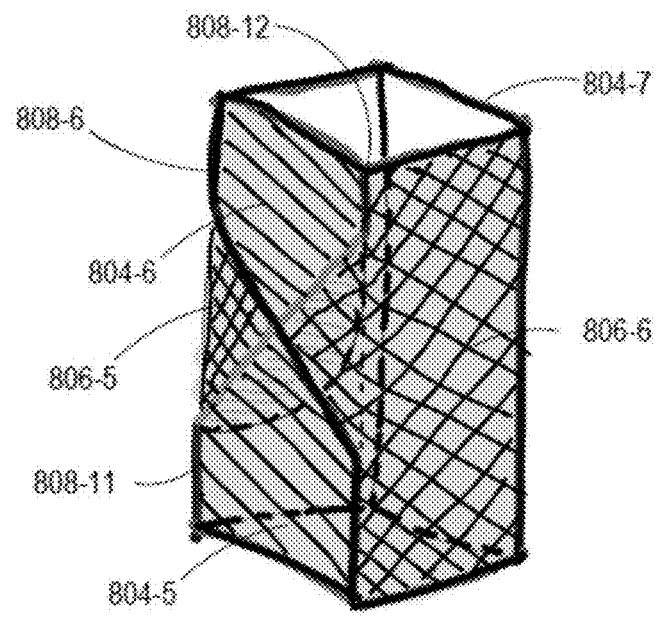

FIG. 8E is an alternative graphical representation of a phase gate in accordance with some embodiments. The phase gate shown in FIG. 8E has fifth surface 804-7.

Figure 8F:
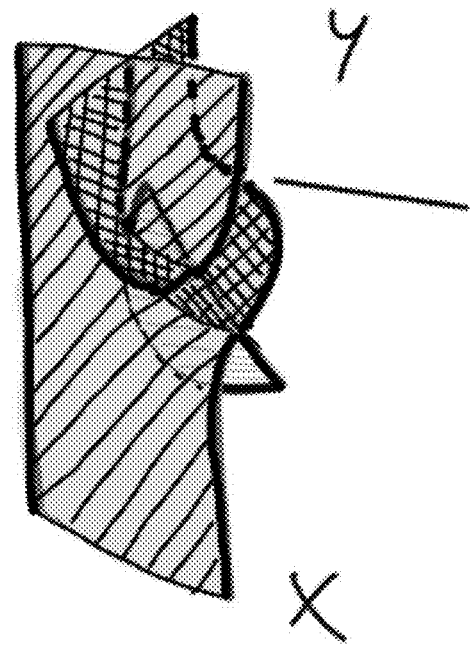
FIG. 8F is a simplified graphical representation of membranes within the phase gate shown in FIG. 8E.

FIG. 8F is a simplified graphical representation of membranes within the phase gate shown in FIG. 8E.

In some embodiments, by performing measurements in X-basis on qubits located within the phase gate (e.g., qubits that are not located on the boundary), information represented by one or more qubits on an input surface of the phase gate (e.g., a bottom surface) is processed. In some embodiments, the outcome of the phase gate operations is represented by one or more qubits on an output surface of the phase gate (e.g., a top surface).

The gates shown in FIGS. 8A-8F need not be used separately. For example, two or more gates are coupled to perform combined operations. In some embodiments, an output surface of the Hadamard gate is coupled to an input surface of the phase gate. In some embodiments, an output surface of the phase gate is coupled to an input surface of the Hadamard gate. In some embodiments, the Hadamard gate and/or the phase gate illustrated herein are coupled to any other gate (e.g., a conditional NOT gate, which is also called a CNOT gate). For brevity, such details are not repeated herein.

Figure 4A:
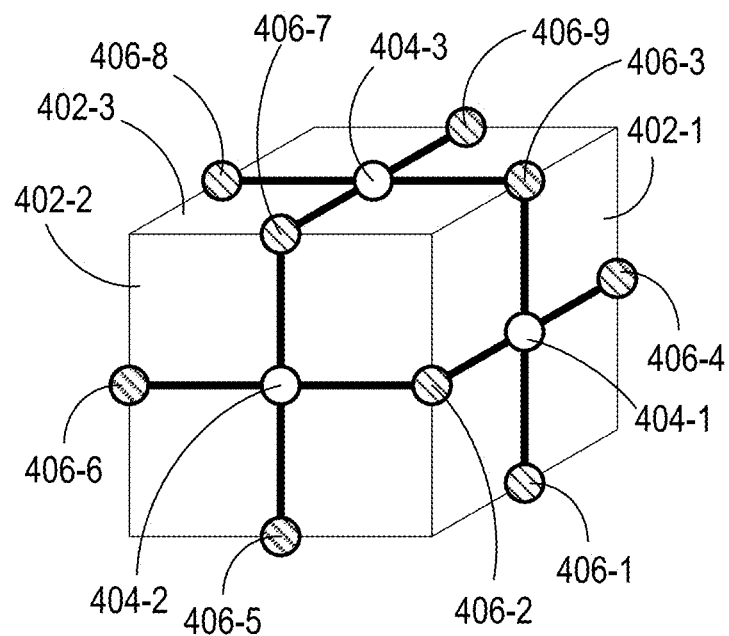
FIGS. 4A-4D are schematic diagrams illustrating a solid representation of an example unit cell in accordance with some embodiments.

FIG. 4A is a schematic diagram illustrating a solid representation of an example unit cell of a cluster state in accordance with some embodiments.

The unit cell shown in FIG. 4A has a shape of a convex hexahedron (e.g., a cuboid, such as a rectangular cuboid, and in particular, a cube).

The unit cell in FIG. 4A has six faces (of which three faces 402-1, 402-2, and 402-3 are shown in FIG. 4A). In FIG. 4A, each face of the unit cell has a corresponding qubit (also called herein a face qubit). For example, in FIG. 4A, face 402-1 corresponds to qubit 404-1, face 402-2 corresponds to qubit 404-2, and face 402-3 corresponds to qubit 404-3.

The unit cell in FIG. 4A has twelve edges (of which nine edges are shown in FIG. 4A). In FIG. 4A, each edge of the unit cell has a corresponding qubit (also called herein an edge qubit). For example, in FIG. 4A, each of edge qubits 406-1, 406-2, 406-3, 406-4, 406-5, 406-7, 406-8, 406-9 corresponds to a distinct edge. In this unit cell example, each face qubit is entangled with the respective four edge qubits within the neighborhood of that face qubit, e.g., the qubits that are located on the edges of the face qubits respective face.

Figure 4B:
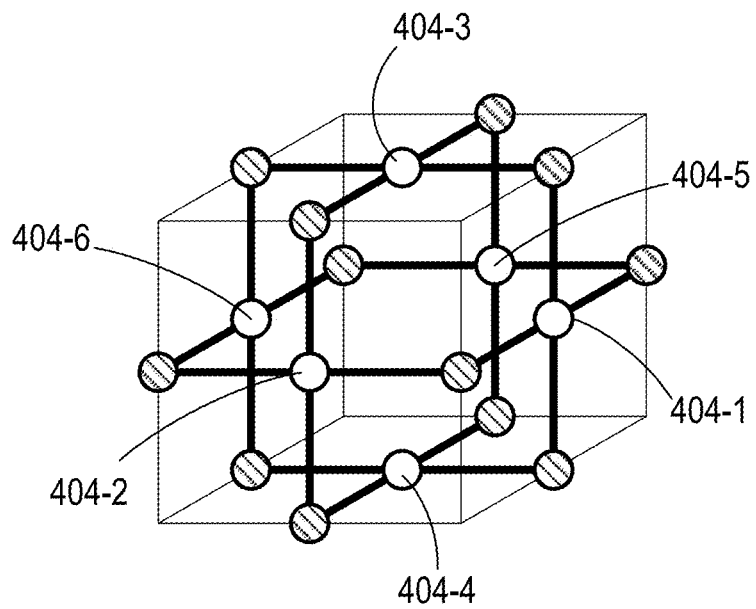

FIG. 4B is a schematic diagram illustrating a wireframe representation of the unit cell shown in FIG. 4A. Faces and edges and their corresponding qubits, masked by faces 402-1, 402-2, and 402-3 in FIG. 4A, are visible in FIG. 4B. For example, qubits 404-4, 404-5, and 404-6, which are not shown in FIG. 4A, are illustrated in FIG. 4B.

Figure 4C:
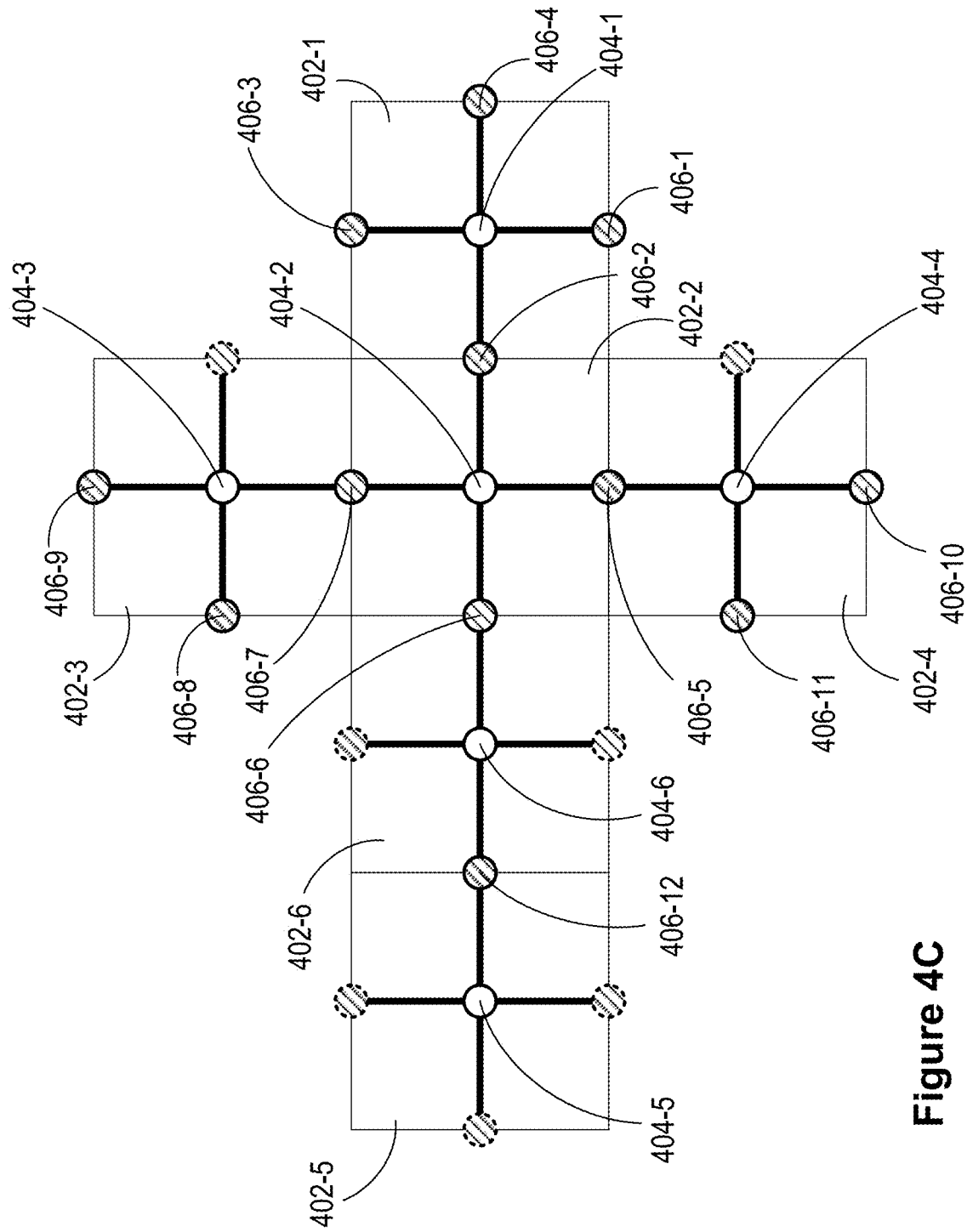

FIG. 4C is an example net of the unit cell shown in FIG. 4A. The net shown in FIG. 4C can be understood as an unfolded representation of the unit cell shown in FIG. 4A.

FIG. 4C illustrates that the net includes six faces 402-1 through 402-6 and corresponding qubits 404-1 through 404-6 (e.g., face 402-4 corresponds to qubit 404-4, face 402-5 corresponds to qubit 404-5, and face 402-6 corresponds to qubit 404-6).

FIG. 4C also illustrates that the net includes twelve edges and corresponding qubits 406-1 through 406-12. Qubit 404-1 is entangled with qubits 406-1, 406-2, 406-3, and 406-4. Qubit 404-2 is entangled with qubits 406-5, 406-6, 406-7, and 406-2. Qubit 404-3 is entangled with qubits 406-7, 406-8, 406-9, and 406-3. Qubit 404-4 is entangled with qubits 406-10, 406-11, 406-5, and 406-1. Qubit 404-5 is entangled with qubits 406-10, 406-4, 406-9, and 406-12. Qubit 404-6 is entangled with qubits 406-11, 406-12, 406-8, and 406-6.

Figure 4D:
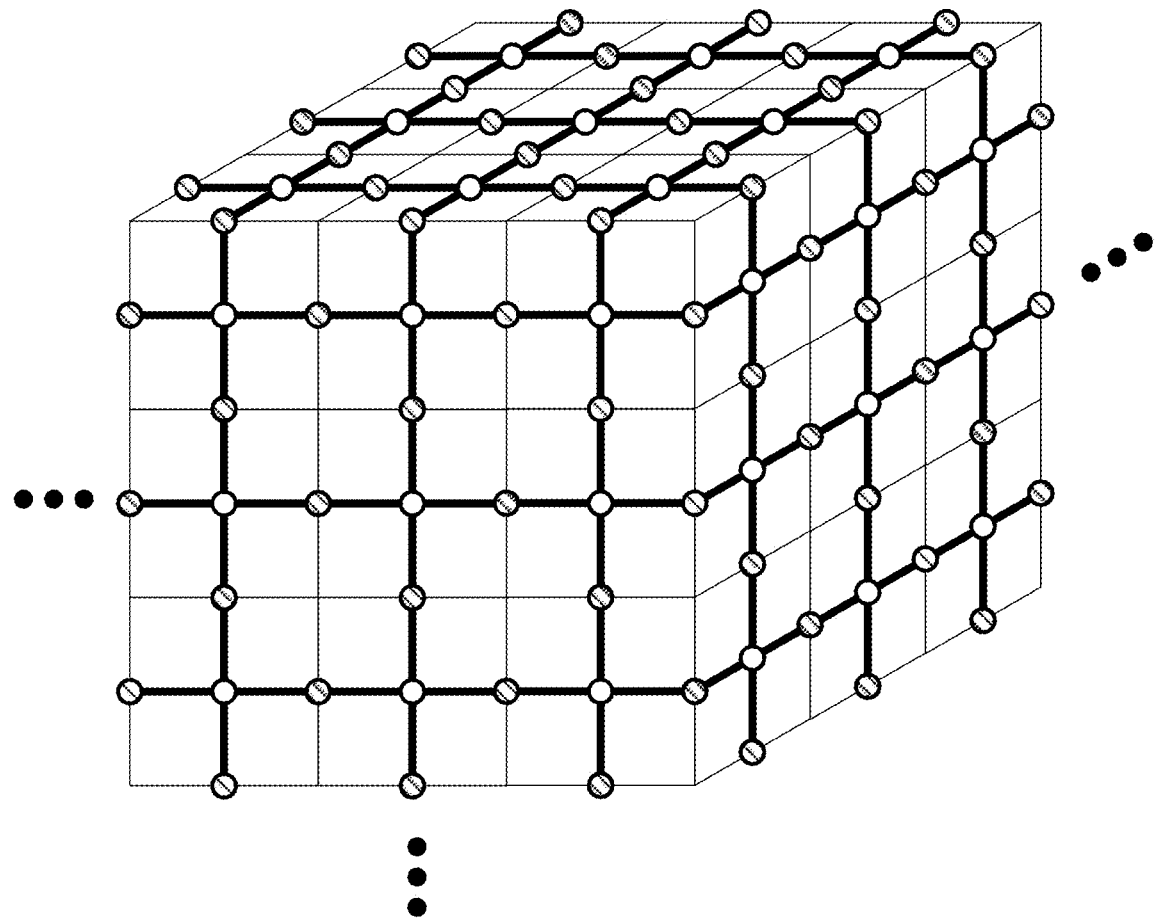

FIG. 4D is a schematic diagram illustrating an example cluster state with a plurality of unit cells in accordance with some embodiments. The example cluster state shown in FIG. 4D includes a contiguous block of unit cells, each unit cell corresponding to the unit cell described with respect to FIGS. 4A-4C. The cluster state shown in FIG. 4D is sometimes called a Raussendorf lattice and can be used to encode one or more logical qubits that are protected against logical errors by way of the particular entanglement geometry between the individual face and edge qubits.

Figure 5A:
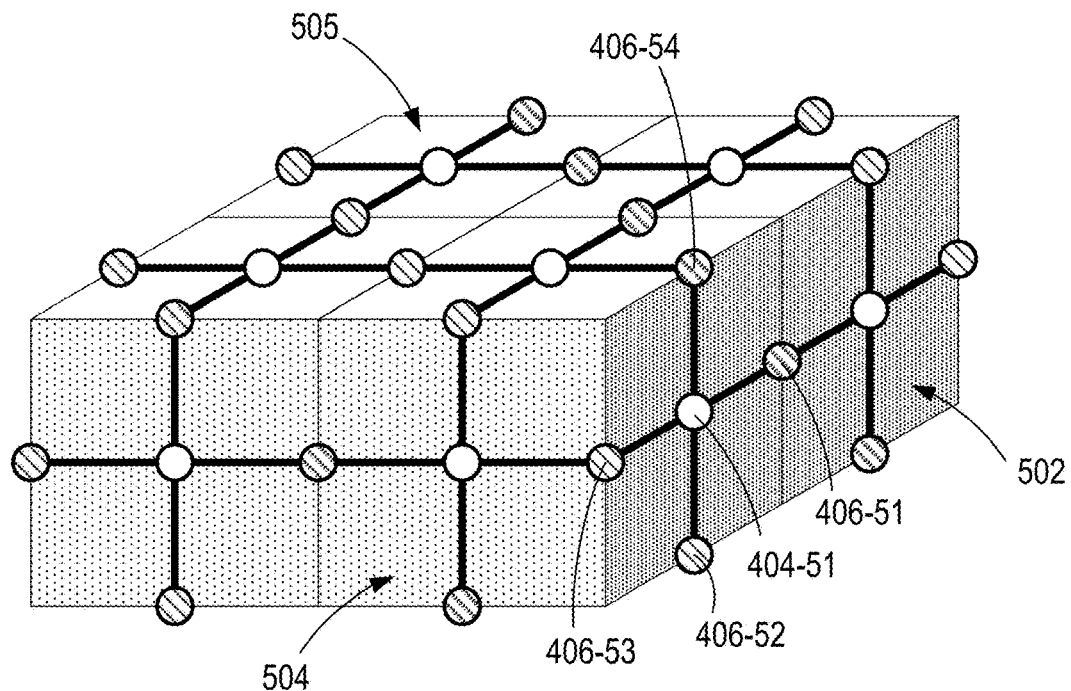
FIG. 5A-5C are schematic diagrams illustrating dual boundaries of unit cells in accordance with some embodiments.

FIG. 5A is a schematic diagram illustrating dual boundaries of unit cells in accordance with some embodiments. In FIG. 5A, four unit cells are arranged in a 2-by-2 configuration. The unit cells have dual boundary 502, dual boundary 504, and dual boundary 505. As shown in FIG. 5A, in some embodiments, a face of a unit cell on a dual boundary includes a single face qubit (e.g., face qubit 404-51) entangled with four edge qubits (e.g., edge qubits 406-51, 406-52, 406-53, and 406-54).

Figure 5B:
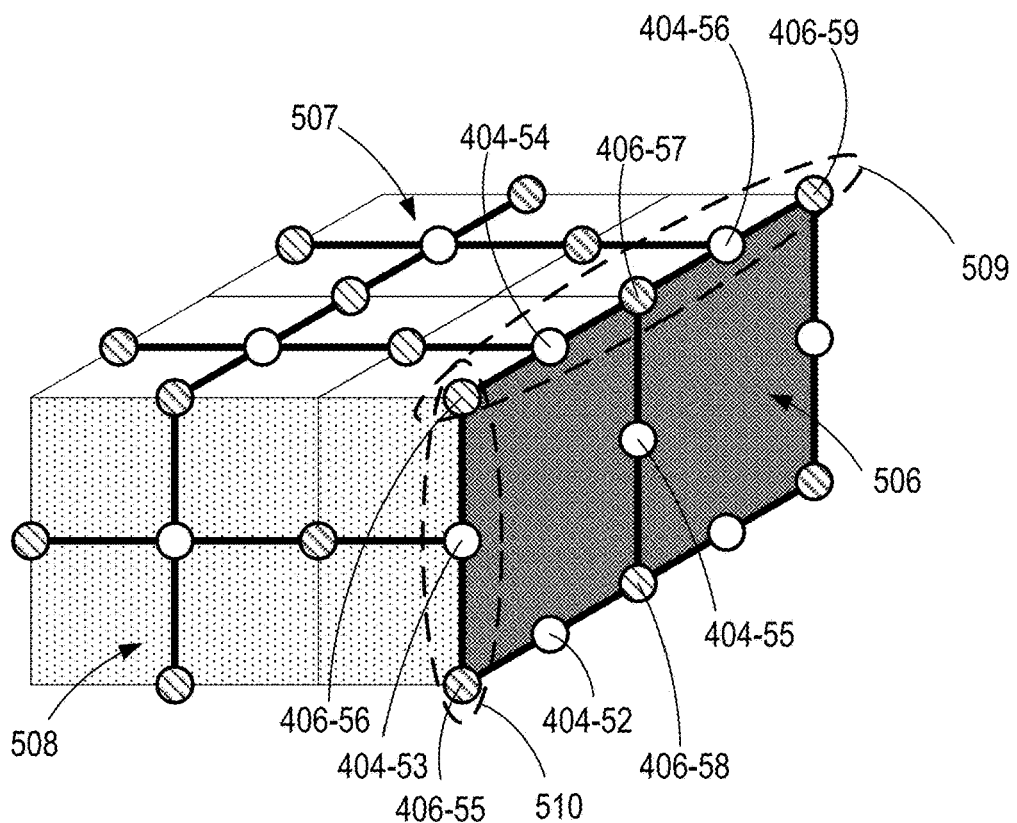

FIG. 5B is a schematic diagram illustrating dual boundaries and a primal boundary of cells in accordance with some embodiments. In FIG. 5B, four cells are arranged in a 2-by-2 configuration. The cells have primal boundary 506, dual boundary 507, and dual boundary 508. As shown in FIG. 5B, in some embodiments, a face of a cell on a primal boundary is represented by four face qubits (which are positioned on edges of the face on the primal boundary, such as face qubits 404-52, 404-53, 404-54, and 404-55) and four edge qubits (which are positioned on corners of the unit cells on the primal boundary, such as edge qubits 406-55, 406-56, 406-57, and 406-58).

FIG. 5B also shows boundary lines 509 and 510 of a first type (which are examples of corner lines described above in reference to FIG. 3 above). As shown in FIG. 5B, in some embodiments, a boundary line of a first type is positioned along an intersection between a primal boundary and a dual boundary (e.g., corner line 509 is located along an intersection between primal boundary 506 and dual boundary 507 and corner line 510 is located along an intersection between primal boundary 506 and dual boundary 508). As shown in FIG. 5B, in some embodiments, a boundary line of the first type connects through an alternating sequence of edge qubits and face qubits (e.g., corner line 509 connects through edge qubit 406-56, face qubit 404-54, edge qubit 406-57, face qubit 404-56, and edge qubit 406-59 and corner line 510 connect through edge qubit 406-55, face qubit 404-53, and edge qubit 406-56).

Figure 5C:
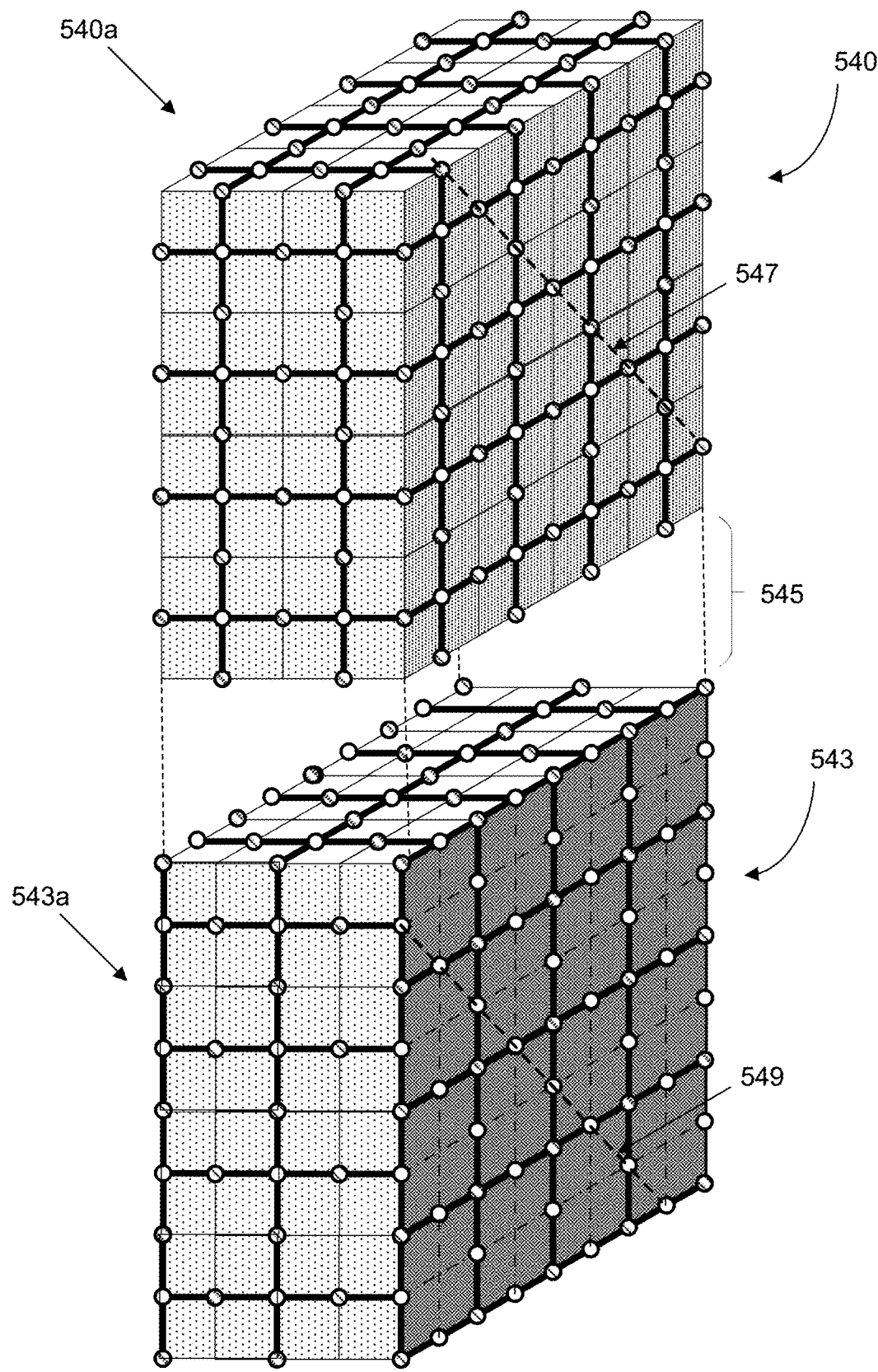

FIG. 5C is a schematic diagram illustrating a microscopic picture of a boundary surface in a cluster state that transitions from a dual boundary 540 of dual lattice cluster state 540a (only a portion of which is shown) to a primal boundary 543 of primal lattice cluster state 543a (only a portion of which is shown). Such a boundary could be, for example, one boundary of four used in the Hadamard gate of FIG. 8A. As described in reference to FIG. 8, to transition from primal to dual (or dual to primal) a defect region 545 is placed in the middle of the overall lattice, where the defect region is shown here as an empty gap for clarity. In some embodiments, to enable a connection scheme within the defect region that allows for the joining of the appropriate qubits, it can be advantageous to join the primal cluster state and dual cluster state not along planes that are defied by the surfaces of the primal and dual unit cells but instead use a defect region that is defined by planes that are oriented 45 degrees with respect to the original lattice unit cells. The boundaries of one example of such 45 degree planes are shown as lines 547 and 549 (shown here as dashed lines).

Figure 6A:
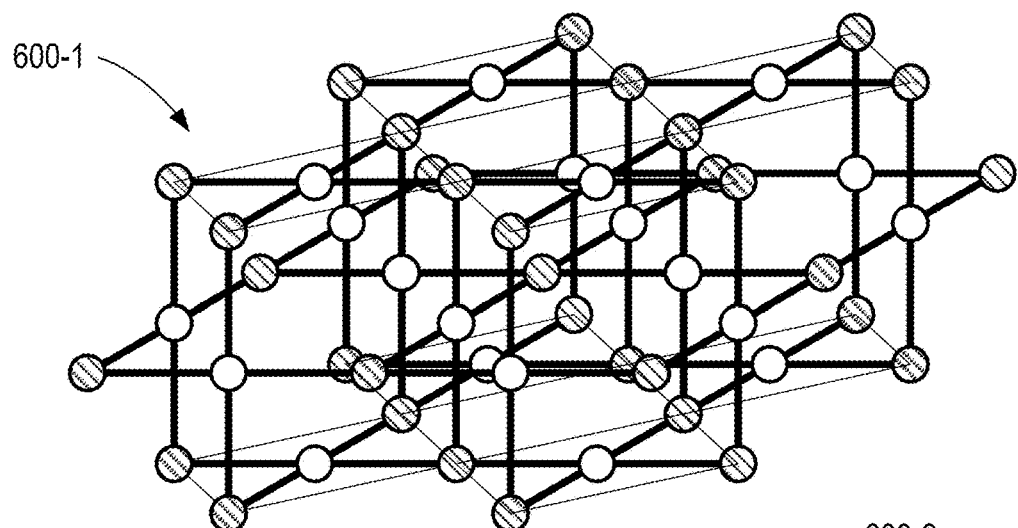
FIGS. 6A-6F illustrates a unit cell arrangement of a qubit cluster state in accordance with some embodiments.

To the above end, FIG. 6A illustrates the same qubits and the same entanglements as those described in FIGS. 4 and 6, but using a unit cell arrangement that is 45 degrees from the usual unit cell associated with the Raussendorf lattice. For example, instead of grouping these qubits into lattice cells in the manner shown in FIG. 4B (e.g., each cell has a face qubit for each face of the cell and an edge qubit for each edge of the cell), in FIG. 6A, the same qubits are grouped into unit cells, each with a top surface and a bottom surface having a face qubit for a respective surface and four edge qubits located at four vertices of the respective surface. FIG. 6B shows a similar arrangement to FIG. 6A except for the primal version of the dual lattice shown in FIG. A.

Figure 6B:
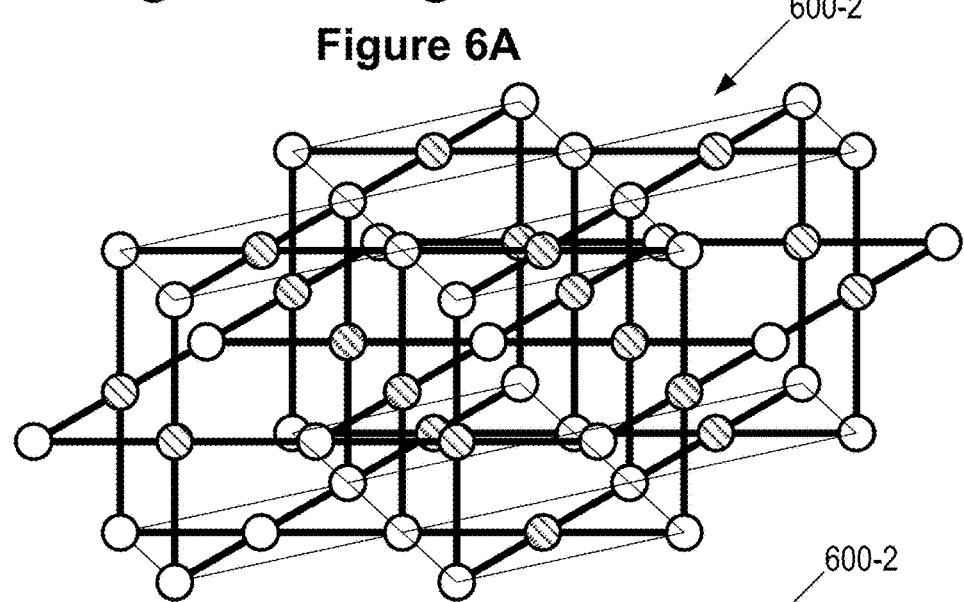
Figure 6C:
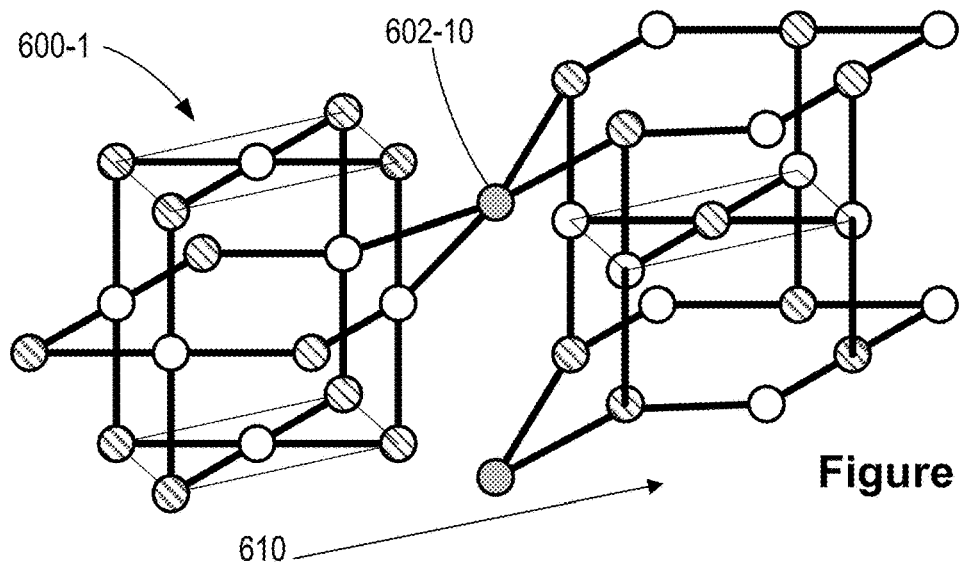

FIG. 6C illustrates only a subset, less than all, of the lattice cells shown in FIG. 6B so as not to obscure certain aspects of the lattice cells and also to show an example of how defect qubits can be used to transition a correlation surface from a primal surface to a dual surface of the constituent lattice. More specifically, FIG. 6C shows dual unit cell 600-1 and primal cell 600-2. To generate the defect region, defect qubit 602-10 is entangled with two edge qubits (that were face qubits form the original non-rotated unit cell) from unit cell 600-1 and two vertex qubits from unit cell 600-2 (that were originally edge qubits from the original non-rotated unit cell).

Figure 6D:
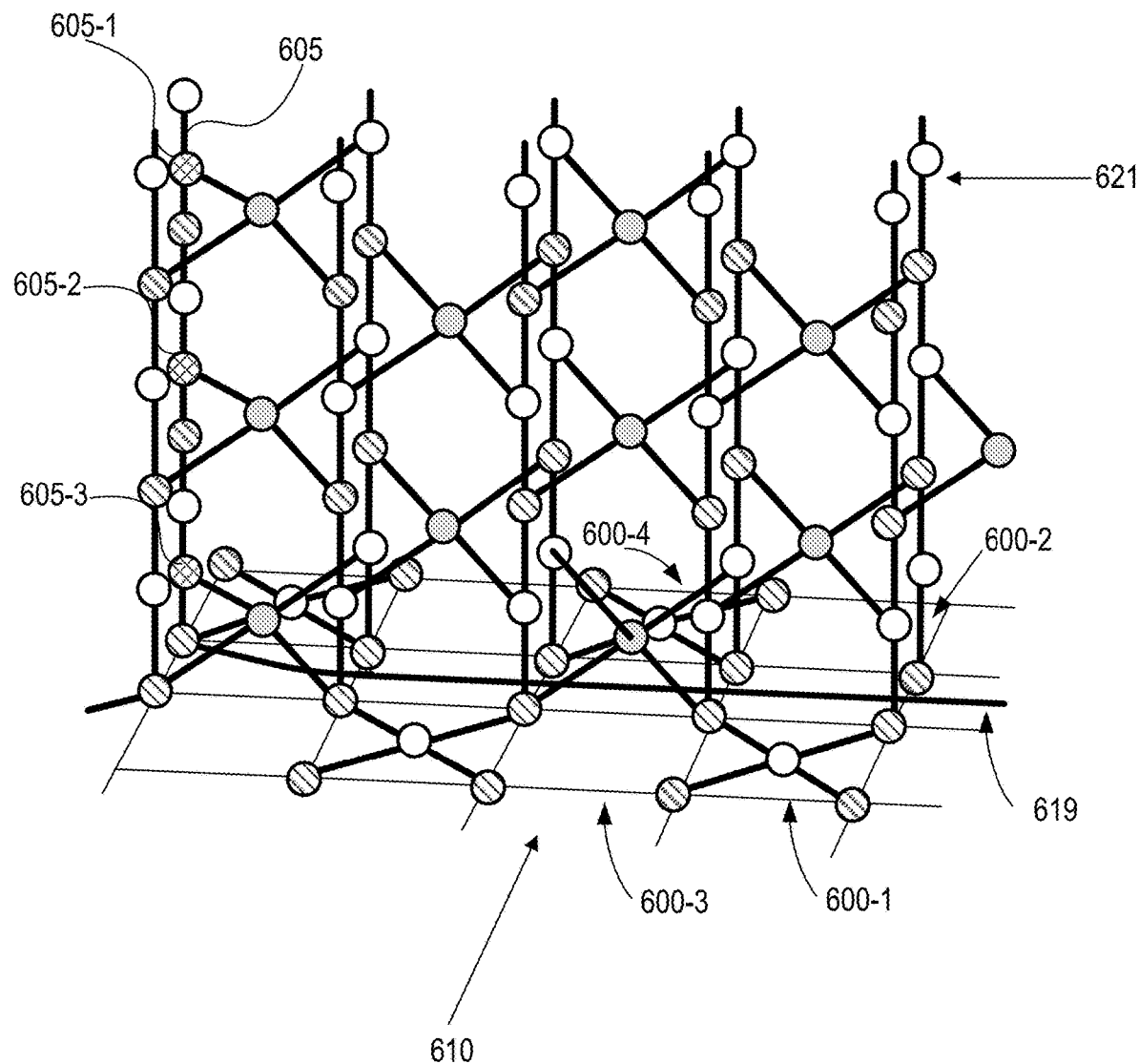

FIG. 6D shows another more extensive view of the defect region as viewed looking through the defect along a direction 610 that starts from cell 600-1 and points toward cell 600-2. FIG. 6D shows a more extensive portion of the defect region in spanning a direction that is perpendicular to the viewing direction. Instead of just a single qubit cell 600-1 and 600-2 on either side of the defect region, portions of 4 qubits are shown. More specifically the outer surface (boundary of the lattice itself facing downward on the page) and the inner surfaces (surfaces that face the defect region) are shown. Defect qubits that make the connections between dual and primal membranes across the defect region are shown as shaded in grey. In addition, FIG. 6D shows a defect region that disappears into the bulk as one moves from right to left in the figure. As described already above, the boundary of a defect region that is located within the bulk is referred to herein as a twist line 605 is formed when the defect region terminates at twist qubits 605-1, 605-2, 605-3, shown in double crosshatch in the figure. For clarity, a 1D line projection 619 of the defect region is shown in the plane perpendicular to the defect region.

Figure 6E:
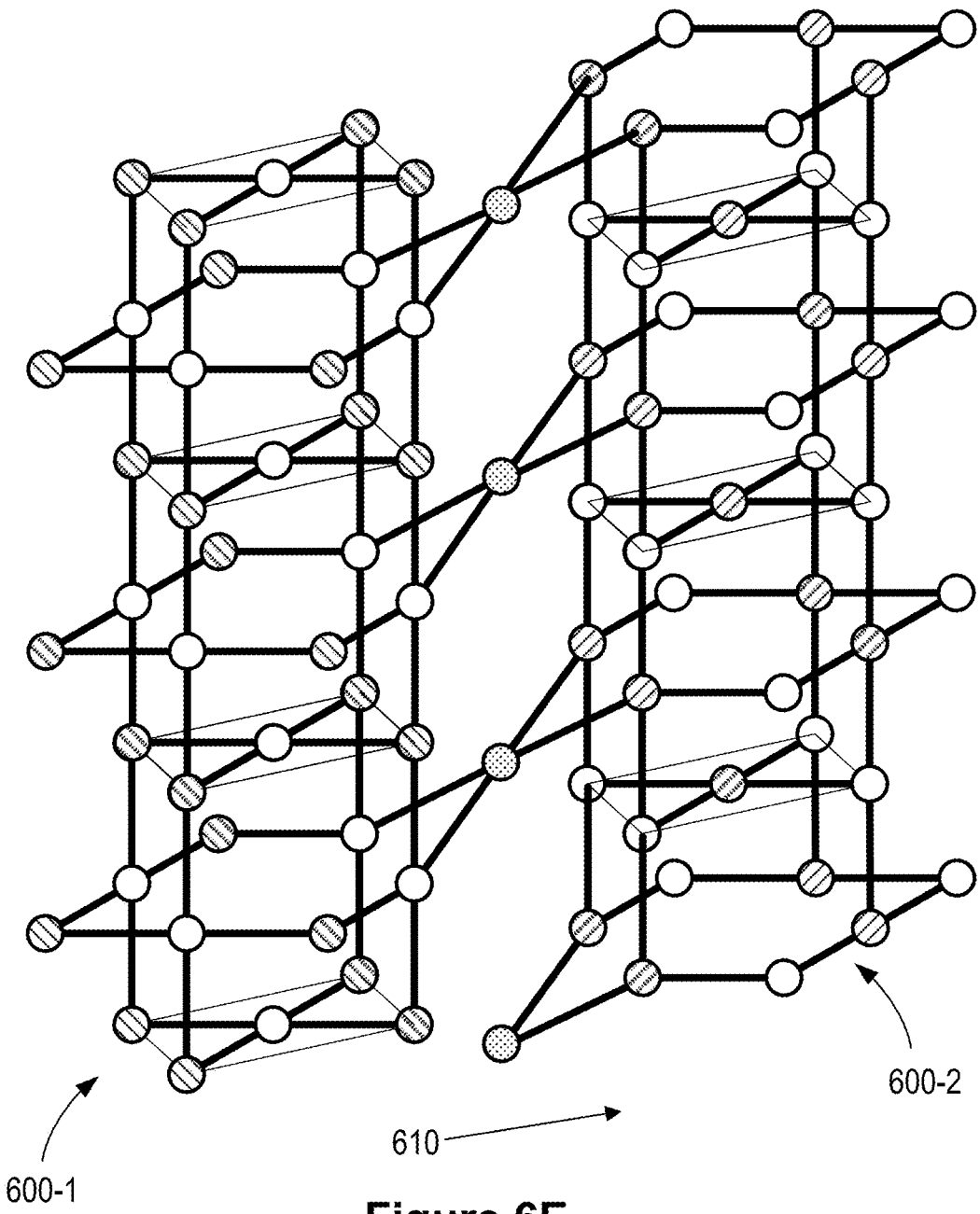
Figure 6F:
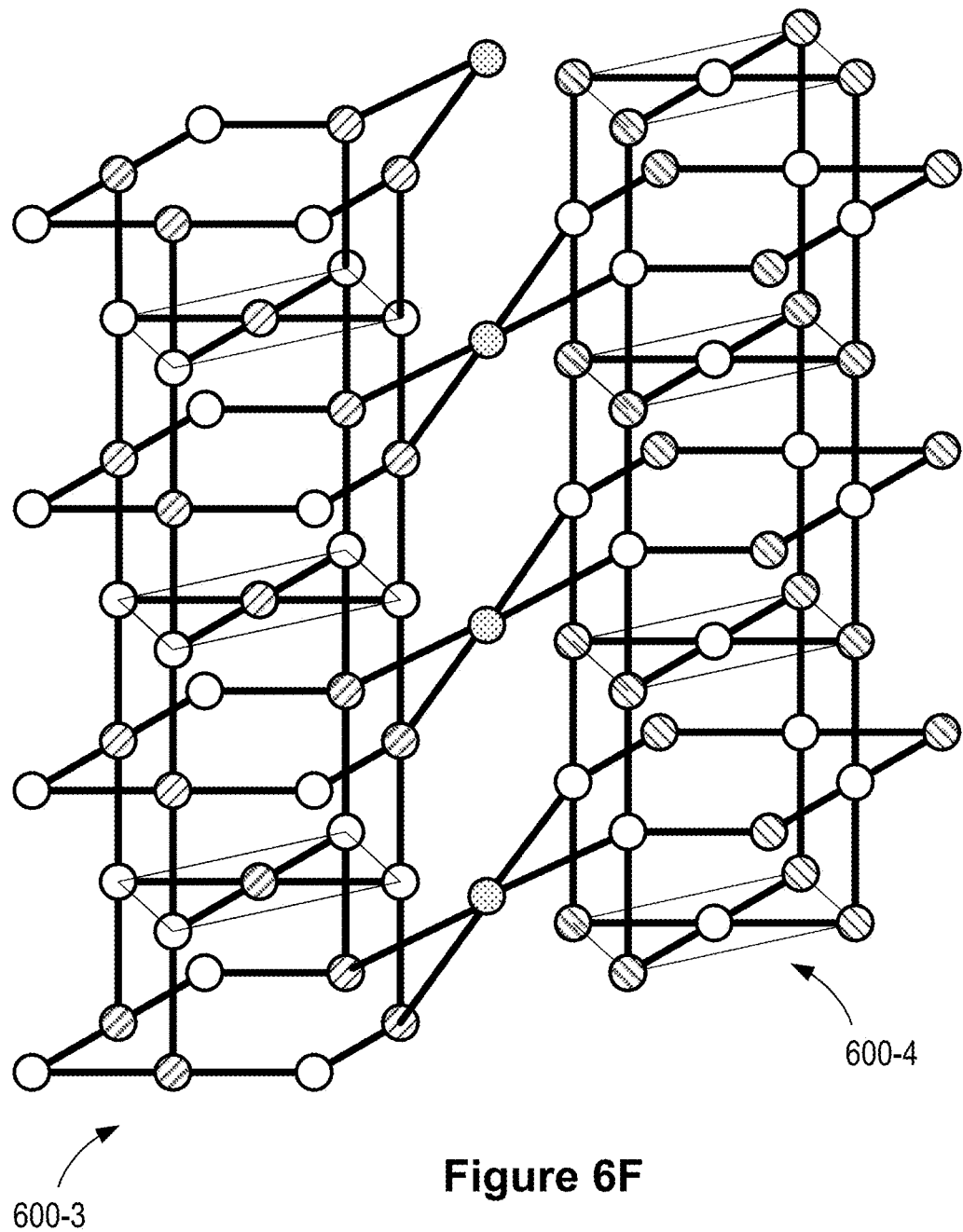

In FIG. 6E-6F more extensive view of a column of cells viewed from a direction that is generally perpendicular to direction 610, i.e., along direction 621 that provides a view down the length of the defect region in order to better illustrate the geometry of the defect qubits for different columns. FIG. 6E shows the view for columns that have cells 600-1 and 600-2 as base cells. FIG. 6F shows a view for the adjacent column of cells, having base cells 600-3 and its corresponding cell 600-4 located across the defect region.

Figure 7:
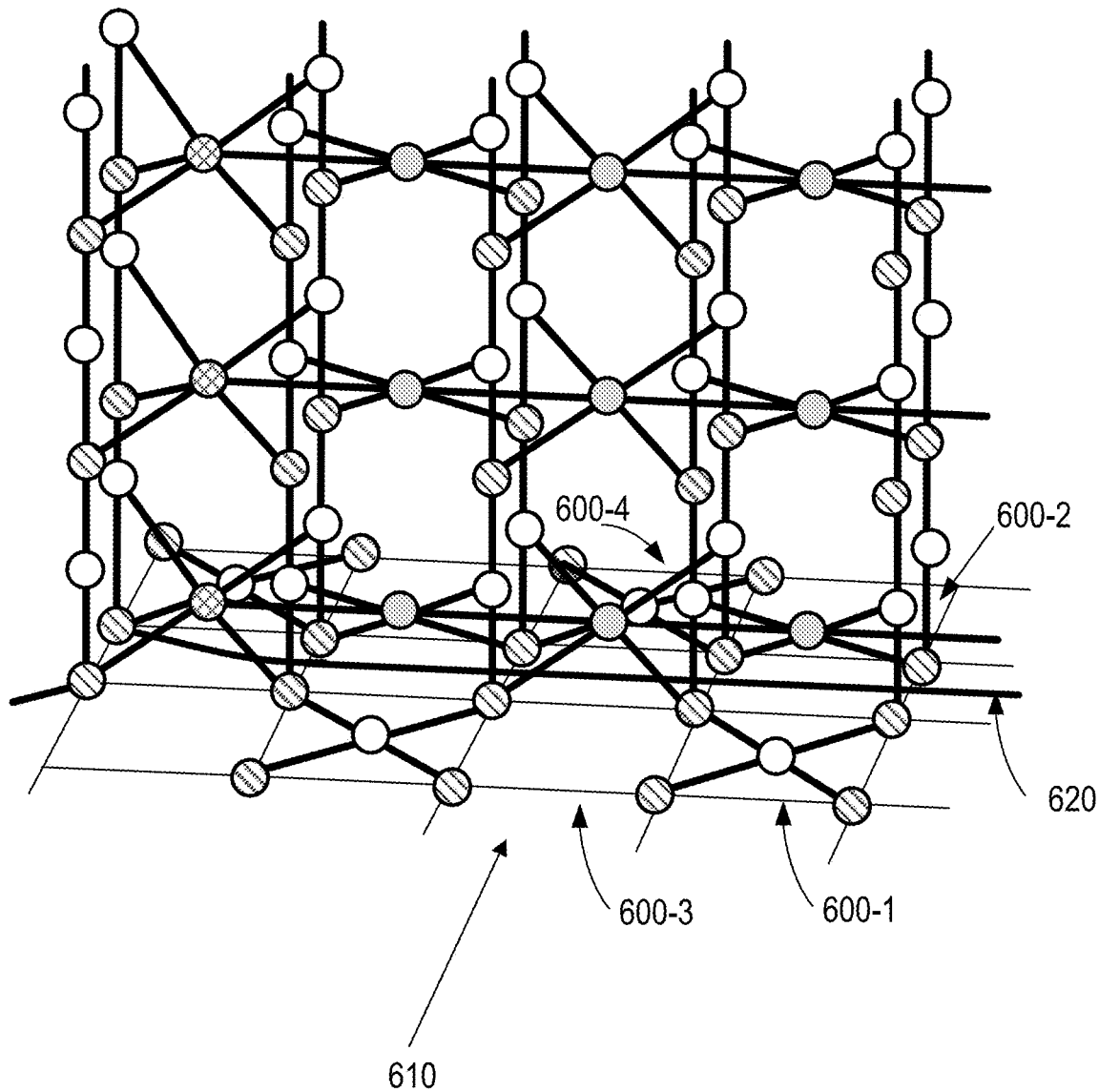
FIG. 7 illustrates a unit cell arrangement of a qubit cluster state in accordance with some embodiments.

FIG. 7 shows another more extensive view of an alternative defect region structure in accordance with some embodiments. As in FIG. 6D, the cluster state is shown as viewed looking through the defect along a direction 610 that starts from cell 600-1 and points toward cell 600-2. Defect qubits that make the connections between dual and primal membranes across the defect region are shown as shaded in grey. In addition, FIG. 7 shows a defect region that disappears into the bulk as one moves from right to left in the figure. As described already above, the boundary of a defect region that is located within the bulk is referred to herein as a twist line as in FIG. 6D. As before, twist qubits are shown in double crosshatch in the figure. For clarity, a 1D line projection 620 of the defect region is shown in the plane perpendicular to the defect region.

It will also be understood that, although the terms first, second, etc. are, in some instances, used herein to describe various elements, these elements should not be limited by these terms. These terms are only used to distinguish one element from another. For example, a first plane could be termed a second plane, and, similarly, a second plane could be termed a first plane, without departing from the scope of the various described implementations. The first plane and the second plane are both planes, but they are not the same plane unless explicitly stated as such.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, a qubit refers to a particle in a particular quantum state. Typically, a qubit stores quantum information, which is used for quantum computing. Examples of a qubit include photons (e.g., having different polarizations), ions (e.g., trapped ions), atoms, nuclei within molecules (e.g., in particular spin states). In some cases, qubits include charge states represented by presence or absence of excess Cooper pairs.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method, comprising:
obtaining a plurality of entangled qubits represented by a lattice structure, the lattice structure including a plurality of contiguous lattice cells, a respective edge of a respective lattice cell corresponding to a respective qubit of the plurality of entangled qubits, a respective face of the respective lattice cell corresponding to a respective qubit of the plurality of entangled qubits, the respective qubit that corresponds to the respective face of the respective lattice cell being entangled with respective qubits that correspond to respective edges of the respective lattice cell that are adjacent to the respective face of the respective lattice cell, wherein:
a first subset of the plurality of entangled qubits defines a first plane;
a second subset of the plurality of entangled qubits, that is distinct from, mutually exclusive to, and adjacent to, the first subset of the plurality of entangled qubits, defines a second plane that is parallel to and offset from the first plane; and
the plurality of entangled qubits includes a defect qubit that is entangled with at least one face qubit on the first plane and at least one edge qubit on the second plane.

2. The method of claim 1, wherein:
the defect qubit is entangled with at least two edge qubits on the first plane; and
the defect qubit is entangled with at least two face qubits on the second plane.

3. The method of claim 2, wherein:
the defect qubit is entangled with at least three edge qubits on the first plane; or
the defect qubit is entangled with at least three face qubits on the second plane.

4. The method of claim 1, wherein:
obtaining the plurality of entangled qubits includes:
receiving a first set of entangled qubits;
receiving a second set of entangled qubits; and
fusing at least a subset of the first set of entangled qubits with at least a subset of the second set of entangled qubits so that the defect qubit is entangled with the at least one face qubit on the first plane and the at least one edge qubit on the second plane.

5. The method of claim 1, wherein:
the plurality of entangled qubits includes at least four pairs of surfaces representing a Hadamard gate, each pair of surfaces of the four pairs of surfaces having a first surface that is a primal boundary and a second surface that is a dual boundary that is adjacent to, and separated by a common defect layer including the defect qubit from, the primal boundary;
a first surface of a first pair of surfaces of the four pairs of surfaces is in contact with a second surface of a second pair of surfaces, that is distinct from the first pair of surfaces, of the four pairs of surfaces;
a second surface of the first pair of surfaces is in contact with a first surface of the second pair of surfaces;
the first surface of the second pair of surfaces is in contact with a second surface of a third pair of surfaces, that is distinct from the first pair of surfaces and the second pair of surfaces, of the four pairs of surfaces;
the second surface of the second pair of surfaces is in contact with a first surface of the third pair of surfaces;
the first surface of the third pair of surfaces is in contact with a second surface of a fourth pair of surfaces, that is distinct from the first pair of surfaces, the second pair of surfaces, and the third pair of surfaces, of the four pairs of surfaces;
the second surface of the third pair of surfaces is in contact with a first surface of the fourth pair of surfaces;
the first surface of the fourth pair of surfaces is in contact with the second surface of the first pair of surfaces; and
the second surface of the fourth pair of surfaces is in contact with the first surface of the first pair of surfaces.

6. The method of claim 5, wherein:
the Hadamard gate has:
an input surface adjacent to the first surface of the first pair of surfaces, the second surface of the second pair of surfaces, the first surface of the third pair of surfaces, and the second surface of the fourth pair of surfaces; and
an output surface that is opposite to the input surface, the output surface being adjacent to the second surface of the first pair of surfaces, the first surface of the second pair of surfaces, the second surface of the third pair of surfaces, and the first surface of the fourth pair of surfaces; and
the method includes performing quantum measurements on at least a subset of the plurality of entangled qubits to perform a Hadamard operation on information represented by one or more qubits on the input surface of the plurality of entangled qubits, thereby obtaining one or more processed qubits on the output surface of the plurality of entangled qubits.

7. The method of claim 1, wherein:
at least a subset of the plurality of entangled qubits represents a phase gate having at least two corner lines;
a first corner line of the two corner lines is located on one or more boundaries of the phase gate;
a first portion of a second corner line of the two corner lines is located on one or more boundaries of the phase gate;
a twist line, extending from the first portion of the second corner line, is located within the phase gate, the twist line at least partially defining a defect layer that includes the defect qubit; and
a second portion of the second corner line, extending from the twist line, is located on one or more boundaries of the phase gate.

8. The method of claim 1, wherein:
the plurality of entangled qubits includes at least four surfaces corresponding to a phase gate, a first surface of the four surfaces being a dual boundary, a second surface of the four surfaces being a primal boundary, a third surface of the four surfaces being a primal boundary, and a fourth surface of the four surfaces being a dual boundary, a first portion of the first surface being in contact with the second surface, a second portion of the first surface being in contact with the third surface, a first portion of the fourth surface being in contact with the third surface, and a second portion of the fourth surface being in contact with the second surface.

9. The method of claim 8, wherein:
the phase gate has:
an input surface adjacent to the first surface, the second surface, and the fourth surface; and an output surface that is opposite to the input surface, the output surface being adjacent to the first surface, the third surface, and the fourth surface; and the method includes performing quantum measurements on at least a subset of the plurality of entangled qubits to perform a phase shift operation on information represented by one or more qubits on the input surface of the plurality of entangled qubits, thereby obtaining one or more processed qubits on the output surface of the plurality of entangled qubits.

10. The method of claim 1, wherein:
the plurality of entangled qubits includes at least four surfaces corresponding to a phase gate, a first surface of the four surfaces being a primal boundary, a second surface of the four surfaces being a dual boundary, a third surface of the four surfaces being a dual boundary, and a fourth surface of the four surfaces being a primal boundary, a first portion of the first surface being in contact with the second surface, a second portion of the first surface being in contact with the third surface, a first portion of the fourth surface being in contact with the third surface, and a second portion of the fourth surface being in contact with the second surface.

11. The method of claim 10, wherein:
the phase gate has:
an input surface adjacent to the first surface, the second surface, and the fourth surface; and
an output surface that is opposite to the input surface, the output surface being adjacent to the first surface, the third surface, and the fourth surface; and
the method includes performing quantum measurements on at least a subset of the plurality of entangled qubits to perform a phase shift operation on information represented by one or more qubits on the input surface of the plurality of entangled qubits, thereby obtaining one or more processed qubits on the output surface of the plurality of entangled qubits.

12. A photonic device, comprising:
one or more gates configured to perform the method of claim 1.

13. The photonic device of claim 12, wherein each gate includes one or more beam splitters.

14. A computer system, comprising
one or more processors; and
a memory coupled to the one or more processors, the memory storing a plurality of instructions executable by the one or more processors, the plurality of instructions comprising instructions that when executed by the one or more processors cause the one or more processors to perform processing comprising:
obtaining a plurality of entangled qubits represented by a lattice structure, the lattice structure including a plurality of contiguous lattice cells, a respective edge of a respective lattice cell corresponding to a respective qubit of the plurality of entangled qubits, a respective face of the respective lattice cell corresponding to a respective qubit of the plurality of entangled qubits, the respective qubit that corresponds to the respective face of the respective lattice cell being entangled with respective qubits that correspond to respective edges of the respective lattice cell that are adjacent to the respective face of the respective lattice cell, wherein:
a first subset of the plurality of entangled qubits defines a first plane;
a second subset of the plurality of entangled qubits, that is distinct from, mutually exclusive to, and adjacent to, the first subset of the plurality of entangled qubits, defines a second plane that is parallel to and offset from the first plane; and
the plurality of entangled qubits includes a defect qubit that is entangled with at least one face qubit on the first plane and at least one edge qubit on the second plane.

15. The computer system of claim 14, wherein:
the defect qubit is entangled with at least two edge qubits on the first plane; and
the defect qubit is entangled with at least two face qubits on the second plane.

16. The computer system of claim 15, wherein:
the defect qubit is entangled with at least three edge qubits on the first plane; or
the defect qubit is entangled with at least three face qubits on the second plane.

17. The computer system of claim 14, wherein:
obtaining the plurality of entangled qubits includes:
receiving a first set of entangled qubits;
receiving a second set of entangled qubits; and
fusing at least a subset of the first set of entangled qubits with at least a subset of the second set of entangled qubits so that the defect qubit is entangled with the at least one face qubit on the first plane and the at least one edge qubit on the second plane.

18. The computer system of claim 14, wherein:
the plurality of entangled qubits includes at least four pairs of surfaces representing a Hadamard gate, each pair of surfaces of the four pairs of surfaces having a first surface that is a primal boundary and a second surface that is a dual boundary that is adjacent to, and separated by a common defect layer including the defect qubit from, the primal boundary;
a first surface of a first pair of surfaces of the four pairs of surfaces is in contact with a second surface of a second pair of surfaces, that is distinct from the first pair of surfaces, of the four pairs of surfaces;
a second surface of the first pair of surfaces is in contact with a first surface of the second pair of surfaces;
the first surface of the second pair of surfaces is in contact with a second surface of a third pair of surfaces, that is distinct from the first pair of surfaces and the second pair of surfaces, of the four pairs of surfaces;
the second surface of the second pair of surfaces is in contact with a first surface of the third pair of surfaces;
the first surface of the third pair of surfaces is in contact with a second surface of a fourth pair of surfaces, that is distinct from the first pair of surfaces, the second pair of surfaces, and the third pair of surfaces, of the four pairs of surfaces;
the second surface of the third pair of surfaces is in contact with a first surface of the fourth pair of surfaces;
the first surface of the fourth pair of surfaces is in contact with the second surface of the first pair of surfaces; and
the second surface of the fourth pair of surfaces is in contact with the first surface of the first pair of surfaces.

19. The computer system of claim 18, wherein:
the Hadamard gate has:
an input surface adjacent to the first surface of the first pair of surfaces, the second surface of the second pair of surfaces, the first surface of the third pair of surfaces, and the second surface of the fourth pair of surfaces; and
an output surface that is opposite to the input surface, the output surface being adjacent to the second surface of the first pair of surfaces, the first surface of the second pair of surfaces, the second surface of the third pair of surfaces, and the first surface of the fourth pair of surfaces; and the processing further comprising performing quantum measurements on at least a subset of the plurality of entangled qubits to perform a Hadamard operation on information represented by one or more qubits on the input surface of the plurality of entangled qubits, thereby obtaining one or more processed qubits on the output surface of the plurality of entangled qubits.

20. The computer system of claim 14, wherein:

at least a subset of the plurality of entangled qubits represents a phase gate having at least two corner lines;

a first corner line of the two corner lines is located on one or more boundaries of the phase gate;

a first portion of a second corner line of the two corner lines is located on one or more boundaries of the phase gate;

a twist line, extending from the first portion of the second corner line, is located within the phase gate, the twist line at least partially defining a defect layer that includes the defect qubit; and a second portion of the second corner line, extending from the twist line, is located on one or more boundaries of the phase gate.

* * * * *